(12) United States Patent
Buco et al.

(10) Patent No.: US 8,745,628 B2
(45) Date of Patent: Jun. 3, 2014

(54) EXECUTION ORDER MANAGEMENT OF MULTIPLE PROCESSES ON A DATA PROCESSING SYSTEM BY ASSIGNING CONSTRAINED RESOURCES TO THE PROCESSES BASED ON RESOURCE REQUIREMENTS AND BUSINESS IMPACTS

(75) Inventors: Melissa Jane Buco, Amawalk, NY (US); Jarir Kamel Chaar, Iarrytown, NY (US); Rong Nickle Chang, South Pleasantville, NY (US); Guerney Douglass Holloway Hunt, Yorktown Heights, NY (US); Laura Zaihua Luan, Putnam Valley, NY (US); Christopher Ward, Glen Ridge, NJ (US)

(73) Assignee: International Business Machines Corporation, Armonk, NY (US)

( * ) Notice: Subject to any disclaimer, the term of this patent is extended or adjusted under 35 U.S.C. 154(b) by 1055 days.

(21) Appl. No.: 12/125,375

(22) Filed: May 22, 2008

(65) Prior Publication Data

US 2008/0222645 A1    Sep. 11, 2008

Related U.S. Application Data

(63) Continuation of application No. 10/967,779, filed on Oct. 18, 2004, now abandoned.

(51) Int. Cl.
*G06F 9/46* (2006.01)
*G06Q 10/00* (2012.01)
*G06F 9/50* (2006.01)
*G06Q 10/06* (2012.01)
*G05B 19/418* (2006.01)

(52) U.S. Cl.
CPC .............. *G06F 9/5038* (2013.01); *G06F 9/505* (2013.01); *G06F 9/50* (2013.01); *G06Q 10/06311* (2013.01); *G06Q 10/06375* (2013.01); *G06Q 10/06312* (2013.01); *G06Q 10/06* (2013.01); *G05B 19/41865* (2013.01)

USPC ......... 718/104; 718/102; 705/7.22; 705/7.23; 705/7.25

(58) Field of Classification Search
None
See application file for complete search history.

(56) References Cited

U.S. PATENT DOCUMENTS 6,832,201 B1 * 12/2004 Leymann et al. ............ 705/7.26
6,857,020 B1 * 2/2005 Chaar et al. .................. 709/226

(Continued)

OTHER PUBLICATIONS

Salimifard et al; Petri net-based modeling of workflow system: An overview; European Journal of Operational Research, 2001.*

(Continued)

*Primary Examiner* — Abdullah Al Kawsar
*Assistant Examiner* — Bing Zhao
(74) *Attorney, Agent, or Firm* — Ryan, Mason & Lewis, LLP

(57) ABSTRACT

Techniques are presented for managing execution of processes on a data processing system The data processing system comprises process instances that are each an execution of a corresponding process. Each process instance comprises activity instances. Business impacts are determined for the process instances, the activity instances, or both. Order of execution of the activity instances is managed by allocating resources to activity instances in order to achieve an objective defined in terms of the business impacts. In another embodiment, requests are received for the execution of the processes. For a given request, one or more of the operations of assigning, updating, aggregating, and weighting of first business impacts associated with the given request are performed to create second business impacts associated with the given request. Additionally, requests can be modified. Modification can include changing the process requested or process input as deemed appropriate, combining related requests into a single request, or both. Unmodified requests and any modified requests are managed.

22 Claims, 26 Drawing Sheets

(56) References Cited

U.S. PATENT DOCUMENTS

| | | | |
|---|---|---|---|
| 6,901,347 B1* | 5/2005 | Murray et al. | 702/182 |
| 6,983,321 B2* | 1/2006 | Trinon et al. | 709/224 |
| 7,236,939 B2* | 6/2007 | Chen et al. | 705/7.13 |
| 7,565,304 B2* | 7/2009 | Casati et al. | 705/7.27 |
| 7,603,285 B2* | 10/2009 | Jacobs et al. | 705/7.14 |
| 7,610,228 B2* | 10/2009 | Hellerstein et al. | 705/36 R |
| 2002/0107914 A1* | 8/2002 | Charisius et al. | 709/203 |
| 2002/0120484 A1* | 8/2002 | Bantz et al. | 705/8 |
| 2002/0198727 A1* | 12/2002 | Ann et al. | 705/1 |
| 2004/0111430 A1* | 6/2004 | Hertling et al. | 707/104.1 |
| 2004/0187089 A1* | 9/2004 | Schulz | 717/101 |
| 2005/0125768 A1* | 6/2005 | Wong et al. | 717/100 |
| 2006/0069605 A1* | 3/2006 | Hatoun | 705/9 |

OTHER PUBLICATIONS

Russell et al; Workflow resource patterns, 2004.*

Han et al; A Taxonomy of Adaptive Workflow Management, 2002.*

Machiraju et al; Quality of Business Driven Service Composition and Utility Computing, HPL-2002-66, Mar. 15, 2002.*

U.S. Appl. No. 10/658,726, Sep. 9, 2003, Wolfe et al.

Wolf et al., "Automatic Control of Semi-Automated Service Quality Management Processes in Business Terms," IBM Academy Conference on Human Interaction with Autonomic Computing Systems, IBM Almaden Research Center (Jun. 18-19, 2003).

Buco at al., "Managing eBusiness on Demand SLA Contracts in Business Terms Using the Cross-SLA Execution Manager SAM," Sixth International Symposium on Autonomous Decentralized Systems (ISADS 2003, Piza, Italy, Apr. 9-11, pp. 157-164 (2003).

Buco et al., "Utility Computing SLA Management Based Upon Business Objectives," to appear in IBM Systems Journal, vol. 43, No. 1 (2003).

Cao et al., "GridFlow: Workflow Management for Grid Computing," 3rd International Symposium on Cluster Computing and the Grid, Tokyo, Japan csdl.computer.org/comp/proceedings/cgrid/2003/1919/00/19190198abs.htm, (May 12-15, 2003).

MacLaren, J., "Service Level Agreement Based Scheduling," University of Manchester, www.sve.man.ac.uk/Research/AtoZ/SLABS/, (2003).

Meng et al., "Flexible Inter-enterprise Workflow Management using E-Services," harris.cise.ufl.edu/projects/publications/wecwis02.pdf, (2002).

* cited by examiner

100

PROCESS EXECUTION MANAGER
590

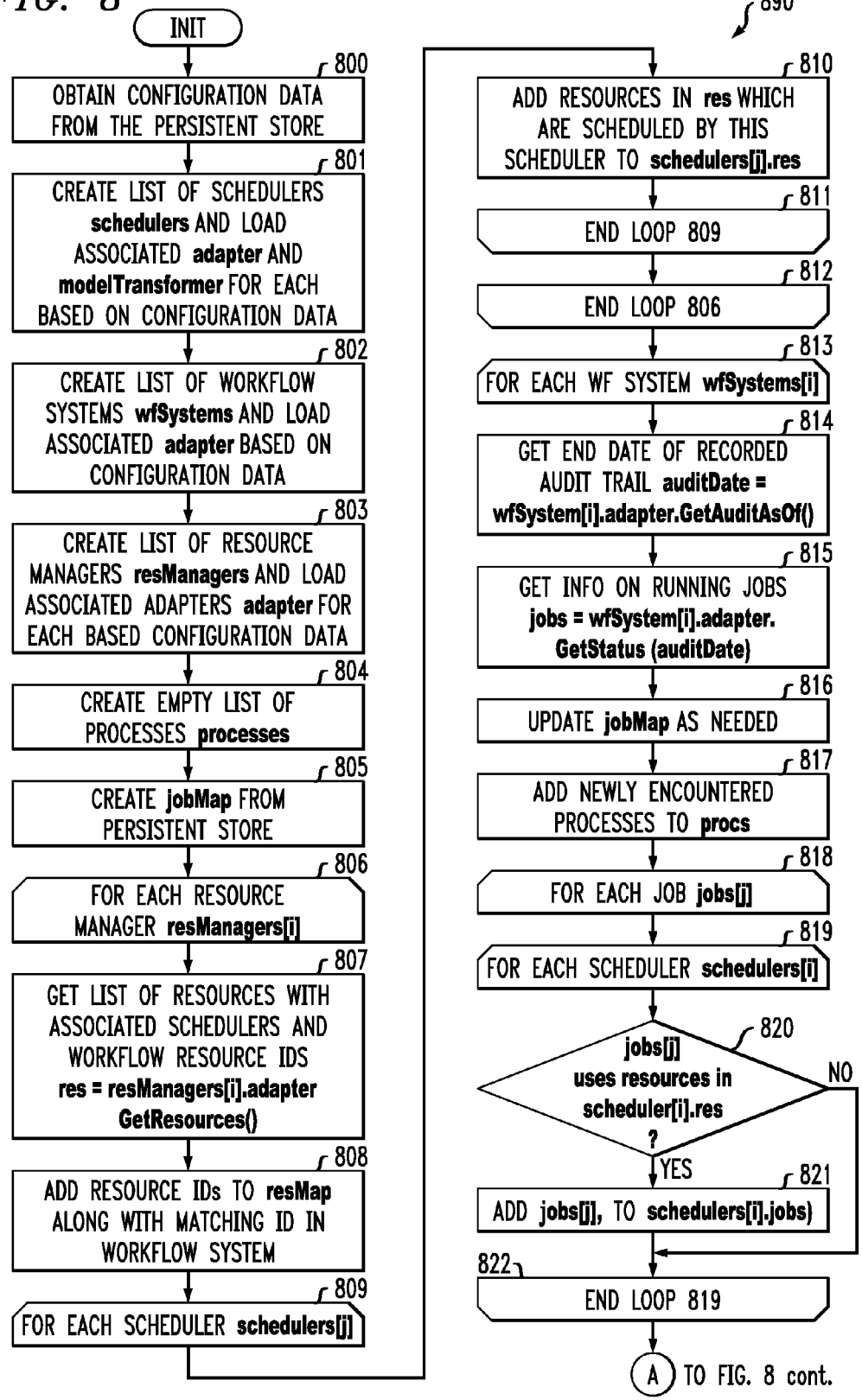

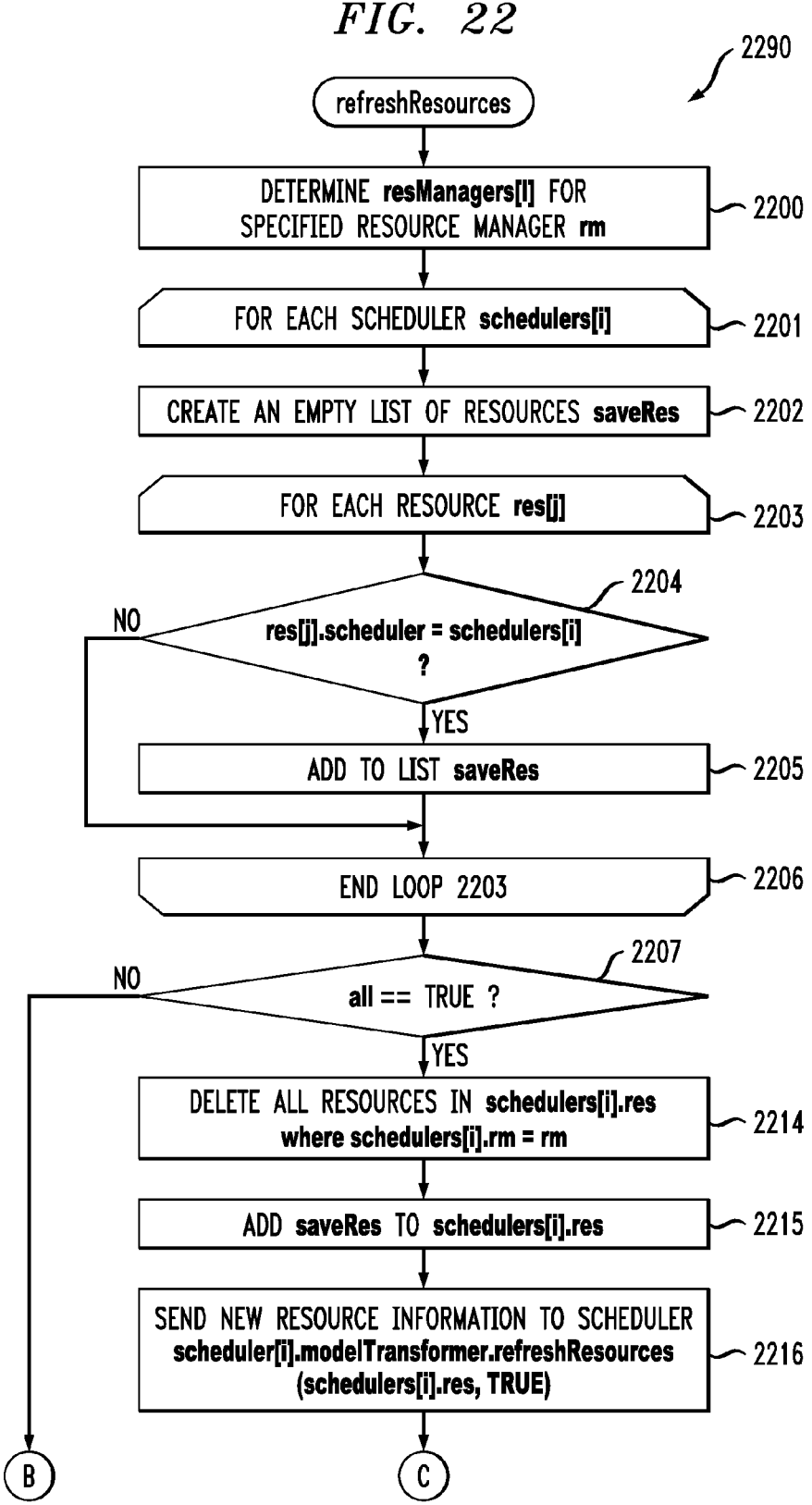

EXECUTION ORDER MANAGEMENT OF MULTIPLE PROCESSES ON A DATA PROCESSING SYSTEM BY ASSIGNING CONSTRAINED RESOURCES TO THE PROCESSES BASED ON RESOURCE REQUIREMENTS AND BUSINESS IMPACTS

CROSS-REFERENCE TO RELATED APPLICATIONS

This application is a continuation of U.S. patent application Ser. No. 10/967,779, filed Oct. 18, 2004, now abandoned incorporated by reference herein

FIELD OF THE INVENTION

The present invention relates generally to the field of Workflow Management Systems (WFMSs), and relates, in particular, to controlling the order of activity execution in a WFMS based upon resource requirements and impact to the business.

BACKGROUND OF THE INVENTION

A workflow process (called a "process" herein) is a directed, acyclic graph of activities to be performed In general, an activity is a unit of work to be performed by, for instance, a human or a software agent; a block of activities which can be repeated until some condition is reached; or another process. Between activities are links, possibly conditional, which are evaluated at runtime to determine an execution path. Data can also be passed between activities or made globally available to all activities.

Because a process is a graph of activities to be conditionally performed, a process is considered to be a model (i.e., a template) for the execution of the activities. An execution of a process is referred to as a process instance. The representation of an activity within a process is performed by an activity instance. If and in what order the activity instances within a process instance are readied for execution is determined by the links between activity instances in the process model. An activity instance which is ready to be executed can be queued in one or more work lists, each of which is associated with a human or software agent which can perform the activity, and is commonly referred to as a work item. In the scheduling domain, a job is equivalent to a process instance, and a task is equivalent to an activity instance or a work item.

A Workflow Management System (WFMS) enables the modeling and execution of processes. A WFMS facilitates codification, automation, composition, and lifecycle management of business system support (BSS) and operations system support (OSS) processes. IBM WebSphere MQ Workflow is an example of a WFMS. Workflow management is also emerging as an important application execution management technology, particularly in the area of grid and utility computing, where planned application execution sequences are essentially managed and composed as automated workflows. The ability to manage the execution of processes is valuable across the many domains where workflow is employed. Some examples of processes which can benefit from process execution management are semi-automated loan approval workflows, Information Technology (IT) operations management workflows (e.g., provisioning of servers), and software application job execution workflows.

Illustratively, consider a business which offers its customers a number of services with guaranteed levels of service level and associated refund and rewards. For example, the business may offer a storage service with a service level guarantee that, over the course of a month, 97 percent of customer requests for additional storage will be provisioned within two hours. If the business fails to meet this commitment, a penalty, which is a percentage of the monthly service fee, will be refunded to the customer. The penalty could be defined as a step function which increases as the percentage of customer requests completed within the threshold of two hours decreases. The business offers several different classes of storage (e.g., economy, fast, and super-fast) with different service level guarantees (e.g., in terms of target percentage and threshold time) at appropriate prices with different refunds and rewards. The refunds and rewards which the business offers to its customer represent an actual financial impact to the business as well as an objective measure of value to the customer.

The business has an obligation to meet its commitments and needs to do so in a cost effective and efficient manner if it is to remain viable and competitive. Therefore, when the business executes its processes (e.g., responding to customer requests for additional storage), the business needs to manage its resources (e.g., people and computing servers) in a manner consistent with the business commitments (e.g., service quality defined as service levels) and cost and efficiency objectives of the business (e.g., to minimize penalties). Current WFMSs ready activity instances for execution based on conditions and navigation defined by the processes, but no explicit consideration is given to objectives or commitments of businesses.

What is needed then are techniques for enabling an organization to manage process execution in a manner which meets its commitments while also meeting its cost and efficiency objectives.

SUMMARY OF THE INVENTION

The present invention provides techniques for managing the execution of processes. Using the present invention allows an organization to meet its commitments while also meeting its cost and efficiency objectives.

In an exemplary aspect of the invention, techniques are presented for managing execution of processes on a data processing system. The data processing system comprises one or more process instances that are each an execution of a corresponding process. Each process instance comprises one or more activity instances. In this exemplary aspect, one or more business impacts are determined for the one or more process instances, the one or more activity instances, or both the one or more process instances and the one or more activity instances. The order of execution of the activity instances is managed by allocating resources to activity instances in order to achieve an objective defined in terms of the one or more business impacts.

In another exemplary aspect of the invention, techniques are presented for managing requests for execution of one or more processes on a data processing system. One or more requests are received for the execution of the one or more processes. For at least a given one of the one or more requests, one or more of the operations of assigning, updating, aggregating, and weighting of one or more first business impacts associated with the given request are performed to create one or more second business impacts associated with the given request. The given request is for execution of a given process. A given request is modified to create a modified request. The modified request is for execution of the given process or another process. Unmodified requests and any modified requests are managed in order to execute processes corresponding to the unmodified and modified requests.

A more complete understanding of the present invention, as well as further features and advantages of the present invention, will be obtained by reference to the following detailed description and drawings.

DETAILED DESCRIPTION OF PREFERRED EMBODIMENTS

Figure 1:
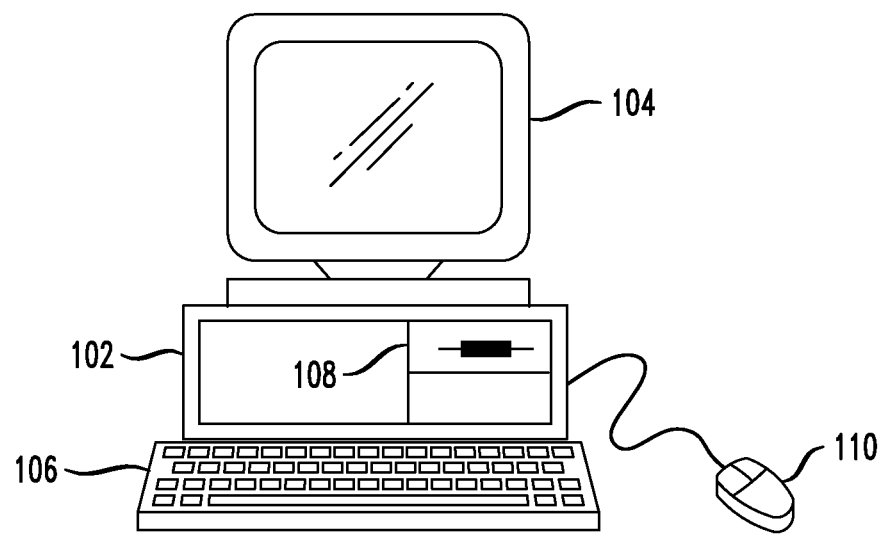
FIG. 1 is a representation of a data processing system in which the present invention may be implemented.

In conventional Workflow Management Systems (WFMSs), a single resource (generally a person or a software agent) is required to perform an activity instance. The WFMS may assign an activity instance to any number of resources which can perform the activity. Eventually, one resource will execute the activity instance using implementation code associated with the activity. At any point in time, a resource may have multiple activity instances which are deemed "ready to execute" assigned to the resource. Which of the ready activity instances and in which order the resource executes these activity instances is generally not dictated by conventional WFMSs. The order is rather left to human intuition or experience, a static priority scheme, or first-come-first-served queuing. Also, if any additional resources (e.g., a software license) are required for execution of an activity instance, it is the responsibility of the activity implementation code, and not the responsibility of the WFMS, to discover, reserve, and obtain those resources.

The present invention can solve these problems by, in an exemplary embodiment, managing the order of activity execution by assigning constrained resources required for execution based on an overall objective defined in terms of one or more business impacts. This is accomplished by, illustratively, integrating one or more WFMSs or equivalents, one or more scheduling systems, and one or more resource managers using a process execution manager controller and one or more business impact integrators. Additionally, requirements for multiple resources per activity instance can be managed. The scheduling system determines when an activity instance requiring constrained resources and deemed "ready to execute" by the WFMS should start and which resources will be assigned to the activity instance. This managing action of starting a task is made, in an exemplary embodiment, in a just-in-time manner so that the scheduling system can accommodate dynamic changes in the system (e.g., newly arriving jobs or changes in business impact for an existing process instance). As a result, a resource (e.g., a human or software agent) typically has only one assignment at a given time (i.e., only one work item in its work list).

A business impact is associated with the execution of a process instance or activity instance or both. A business impact is a measure of relative importance (e.g., defined through a value) that timely execution of an instance (e.g., process or activity instance) will have on the organization. For example, a business may want to execute its processes in a manner which minimizes penalties associated with failure to meet a guaranteed level of service. Thus, the business impact could be the values (e.g., defined as a step function) for penalties associated with not meeting guaranteed levels of service. The overall objective in this scenario is to minimize penalties. The business impact can also include an objective function or pointer to an objective function which could be used by the scheduling system controller when the scheduling system performs an objective optimization.

A business impact can be pre-defined or obtained dynamically at runtime. The business impact can be, but is not limited to, one or more of a simple priority, a utility function, or a cost function over time. Additionally, the business impact can be modified over the duration of the process instance, activity instance, or both process and activity instances.

In certain embodiments of the present invention, a resource is an entity (such as a person, a software agent, hardware, or a software license) required for an activity to be performed. In general, exemplary embodiments of present invention enable an organization to ensure that jobs with a high business impact and a tight deadline will be allocated resources in preference to those jobs with a lower business impact, a more flexible deadline, or both a lower business impact and a more flexible deadline.

Certain embodiments of the present invention are able to address process models ranging from simple task lists to complex task graphs. Illustratively, a process can be fully automated or be partially automated (i.e., contain manual tasks performed by humans). Embodiments of the present invention can also be applied to processes which cross organization boundaries, that is, processes which contain activities which are performed by another organization. The extent to which one can manage resources outside of an organization will depend on the ability to monitor those resources, the extent of control allowed by the owning organization, or both.

For sake of clarity, it is assumed that the term "instance" relates to a process instance or an activity instance. It is also assumed that a "business" is any entity using a WFMS or equivalent, and the terms "organization" and "business" are interchangeable.

Exemplary embodiments of the present invention enable an organization, through a data processing system having a process execution manager, to perform one or more of the following:

(1) associate business impact with instances, where the business impact can be modified throughout the duration of the instances;

(2) capture metadata about processes, where the metadata can be used for scheduling purposes;

(3) manage the order of execution of instances based on the assignment of constrained resources to instances using one or more of the following (although typically all would be used) which could reside on different data processing systems: (A) one or more WFMSs or systems with comparable functions to define the process models and execute the process instances, (B) one or more scheduling systems to order execution of instances by assigning resources to instances in a manner which achieves an objective defined in terms of the business impacts associated with the instances, and (C) one or more resource managers to provide resource information required by the scheduling system or systems selected;

(4) integrate existing WFMSs, scheduling systems, and resource managers via adapters;

(5) extend the definitions of key data (e.g., business impact, resource, override, and task duration) and the functions provided in order to support the requirements of a given environment (e.g., the organization and the selected scheduling systems, workflow systems, and resource managers);

(6) override resource assignments made by the scheduling system(s) as needed;

(7) transform, if possible, a workflow model of a WFMS to one supported by one or more selected scheduling systems;

(8) assign default business impacts, including objective functions, as needed and weight business impacts as required by the organization;

(9) combine individual "related" requests with associated business impacts into a single request with an aggregated business impact; and

(10) modify (e.g., alter or combine) requests for process execution, the modification performed for cost and efficiency purposes, the cost and efficiency determined by one or more criteria set by the organization.

An exemplary embodiment of the present invention describes a method for managing the execution of process instances in one or more existing WFMSs or systems with comparable functionality. Those skilled in the art will recognize that much of the functionality of this invention could also be incorporated into the design of future WFMSs.

According to various exemplary embodiments of the present invention, and as previously described, techniques are provided to manage requests for process execution and to order the execution of activity instances in the process instances in one or more WFMSs. An exemplary goal of the present invention is to achieve some objective defined by the organization in terms of the business impacts associated with the execution of instances. For example, an organization can associate a penalty function with the completion of each process instance and use a scheduling system which would assign resources such that the overall penalty incurred is minimized.

Design elements of an exemplary framework, which can be used to implement an illustrative embodiment of the present invention, can include one or more of the following:

(1) the framework should support multiple and arbitrary WFMSs provided the WFMSs offer the ability to monitor progress at the activity instance level and control the start of an activity instance;

(2) the framework should support multiple and arbitrary scheduling systems;

(3) the framework should support multiple and arbitrary resource managers;

(4) the framework should support multiple business impact integrators;

(5) the framework should, to the extent possible, support transformation of a workflow model to one supported by a particular scheduling system;

(6) the framework should provide core functionality generally supported by WFMSs and extensible functionality for those functions likely to vary by environment;

(7) an assumption may be made that the WFMSs will maintain the current state and history of workflow executions, that the resource managers will maintain the availability and required skill information, and that the scheduling system maintains no persistent data;

(8) the framework can use a store associated with each business impact integrator for maintaining information about the process requests, possible aggregations of requests, possible modifications of requests, and their associated business impacts and aggregations; and (9) the framework can use a store for maintaining information on business impacts associated with process instances, process model information, and override information.

With reference now to the figures and in particular with reference to FIG. 1, a pictorial representation of a computer system 100 in which the present invention may be implemented is depicted in accordance with an exemplary embodiment of the present invention. A computer system 100 is depicted which includes system unit 102, video display terminal 104, keyboard 106, storage devices 108, which may include floppy drives and other types of permanent and removable storage media, and mouse 110. Additional input devices may be included with computer system 100, such as, for example, a joystick, touchpad, touch screen, trackball, microphone, and the like. Computer system 100 can be implemented using any suitable computer. Although the depicted representation shows a computer, other embodiments of the present invention may be implemented in other types of data processing systems, such as a network computer. Computer system 100 also preferably includes a graphical user interface (GUI) that may be implemented by means of systems software residing in computer readable media in operation within computer system 100.

Figure 2:
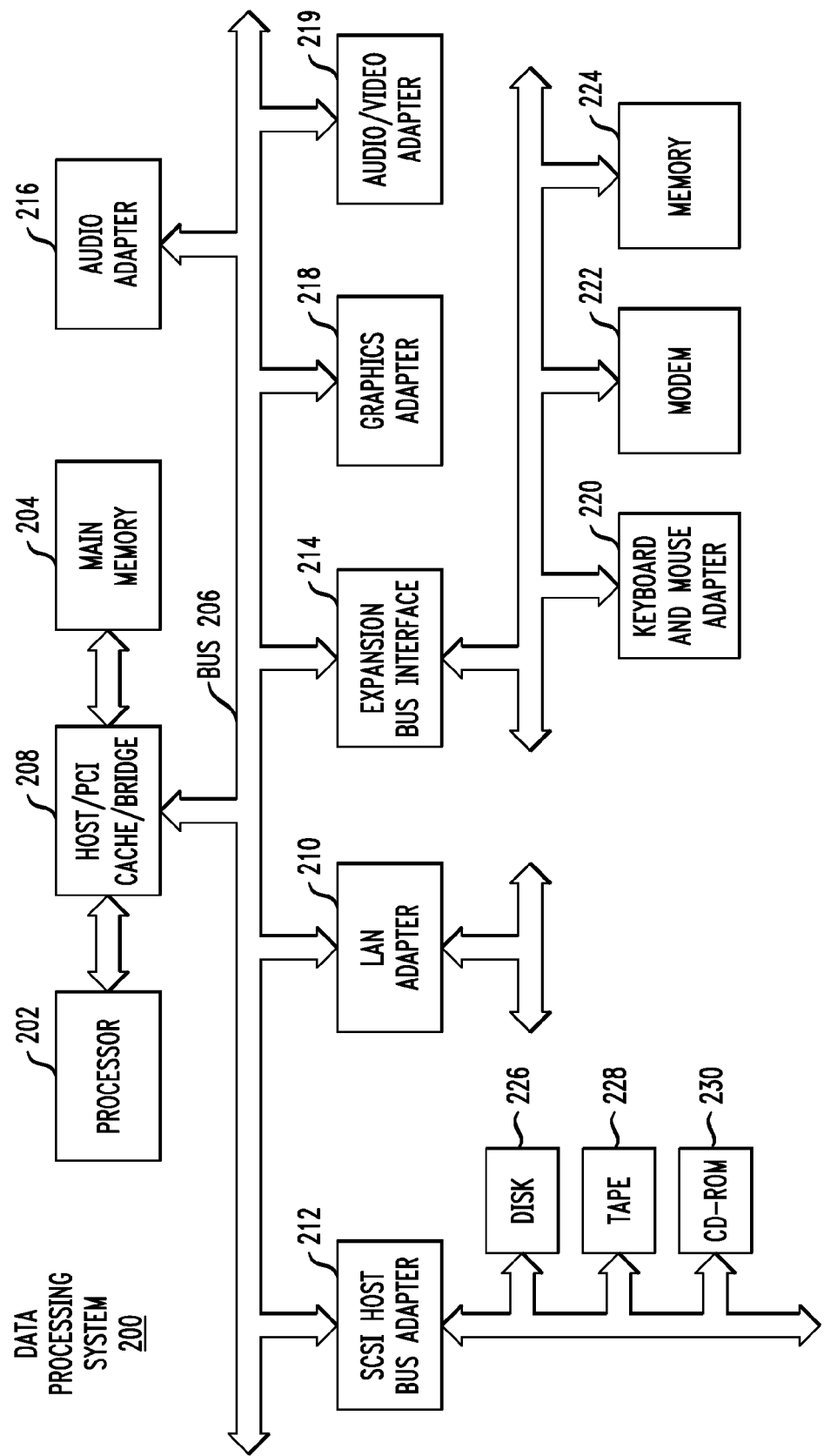
FIG. 2 is a block diagram is shown of a data processing system in which the present invention may be implemented.

With reference now to FIG. 2, a block diagram of a data processing system 200 is shown in which embodiments of present invention may be implemented. Data processing system 200 is an example of a computer system, such as computer system 100 in FIG. 1, in which code or instructions implementing the processes of the present invention may be located. Data processing system 200 employs a Peripheral Component Interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards.

In the depicted example, Local Area Network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCT expansion slots or add-in connectors.

An operating system (not shown) runs on processor 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions (e.g., computer-readable code) for the operating system, the object-oriented programming system, and applications or programs are located on storage devices, such as hard disk drive 226, and may be loaded into main memory 204 for execution by processor 202.

As is known in the art, the methods and apparatus described herein may be distributed as an article of manufacture that itself comprises a computer-readable medium having computer readable program code means embodied thereon. For instance, the computer-readable medium could be disk 226, tape 228, or CD-ROM 230. The computer readable program code means is operable, in conjunction with data processing system 200, to catty out all or some of the steps to perform the methods or create the apparatuses discussed herein.

Further, those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with non-volatile memory, such as flash ROM, to provide for storing operating system files, user-generated data, or both.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance. The processes of the present invention are performed by processor 202 using computer implemented instructions, which may be located in a memory such as, for example, main memory 204, memory 224, or in one or more peripheral devices 226-230.

Figure 3:
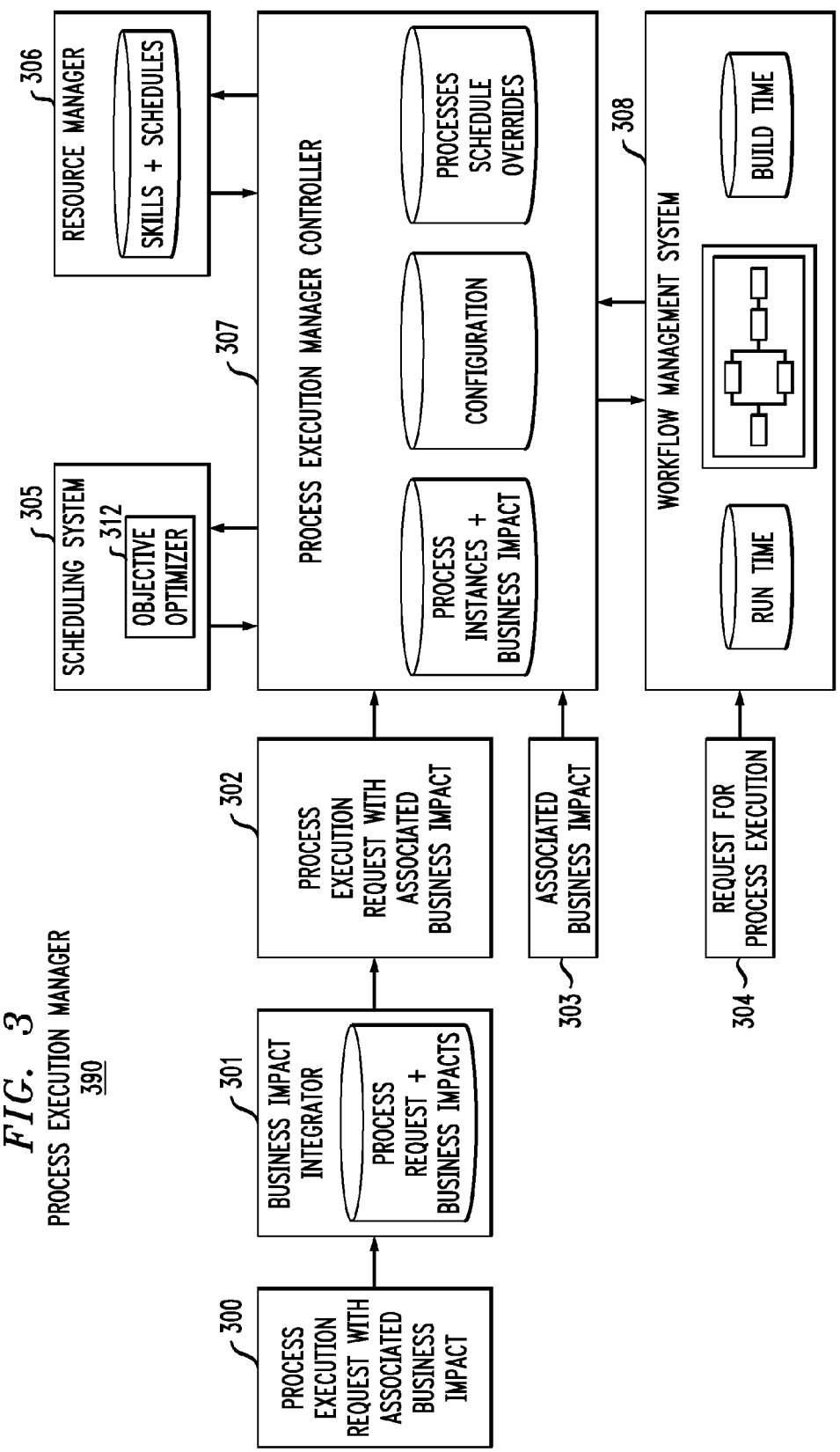
FIG. 3 is an illustrative high level block diagram of an exemplary process execution manager within an organization.

An exemplary embodiment of the present invention is represented in the high level block diagram of FIG. 3, which depicts a process execution manager 390. It should be noted that a process execution manager 390 can be implemented on a distributed computer system comprised on many data processing systems. The process execution manager 390 depicts the process execution manager controller 307 interacting with one or more scheduling systems 305, resource managers 306, and WFMSs 308. FIG. 3 also shows that requests 300 for execution of processes can be sent to a business impact integrator 301 which, in an exemplary embodiment, can (1) assign a default business impact; (2) weight the business impact; (3) combine related requests 300 and aggregate, weight, or both their business impacts; (4) alter individual or combined requests 300; or (5) perform a combination of (1)-(4) to improve cost and efficiency of the execution of instances, which should improve cost and efficiency for the business. The improvement in cost and efficiency of execution of instances may be determined by one or more criteria set by the organization. In other words, the organization itself typically determines how "cost" and "efficiency" are defined, such as faster response time or lower cost It should be noted that not all requests 300 need have an associated business impact. Nonetheless, the capability to combine related requests 300 is useful for those environments where multiple requests 300 for the same process execution are received and should be filtered.

for example, several requests 300 to start a server can be satisfied with a single process execution. The business impact integrator 301 should implement one or more procedures (e.g., algorithms, methods, or functions) for determining if two requests are related and how they should be combined An organization typically defines the one or more procedures used to combine requests 300. The capability to alter requests is useful for cost and efficiency purposes (e.g., defined by an organization and can include cost or time). For example, a request 300 for executing a process may be altered to use another process which will accomplish the same goal more efficiently. The business impact integrator 301 could also combine and alter requests 300 for process execution. For example, the business impact integrator 301 may receive multiple requests 300 for additional storage, where the multiple requests could be combined into another request 300, with an aggregated business impact, where the other request 300 would perform (e.g., through execution of a corresponding process) all the additions for storage in a more cost effective manner. The cost effectiveness can be determined in any number of ways, including execution time of the process. The business impact integrator 301 should have the data and methods implemented to provide this combining function. It should be noted that a given request 300 will have associated with the request 300 a goal.

In an exemplary embodiment of the present invention, as depicted in FIG. 3, there can be multiple business impact integrators 301. A process execution request 302 along with an associated business impact can be sent to one of the business impact integrators. Alternatively, the process execution request 302 can be sent directly to the process execution manager controller 307. In addition, a request 304 to execute process instances can be sent to the WFMS 308 directly. In this case, the associated business impact 303 for the process instance should be sent to or otherwise obtained or determined by the process execution manager controller 307.

The process execution manager controller 307 is used to allow embodiments of the present invention to manage process execution through resource allocation based on business impacts. The business impact integrator 301 may be used to allow embodiments of the present invention to manage requests fox process execution and their associated business impacts. The process execution manager controller 307, in particular, interacts with and provides a framework for the scheduling systems 305, resource managers 306, and the WFMSs 308 to manage process execution. The techniques and data stores for the business impact integrator 301 and the process execution manager controller 307 can be implemented in other entities, such as a WFMS 308.

A role of the scheduling system 305 is to determine which tasks (i.e., activity instances) of those that have been deemed "ready to execute" by the WFMS 308 to start in order to use the required constrained resources in a manner which optimizes the objective function, defined in terms of business impact, of the organization. The process execution manager controller 307 provides the scheduling systems 305 with information on resources (e.g., availability, cost, and capability), process model information, current process execution status, and business impact associated with specific process and activity instances. A conventional scheduling system might assign resources in such a manner as to maximize throughput. By contrast, a scheduling system in an exemplary embodiment of the present invention would use its objective optimizer 312 to assign resources in a manner which achieves a business objective defined in terms of business impact (e.g. minimize penalty) and in a just-in-time fashion so as to take into account any dynamic changes in the system (e.g., a newly arrived job, updates to business impact of an existing jobs, etc.).

Figure 4:
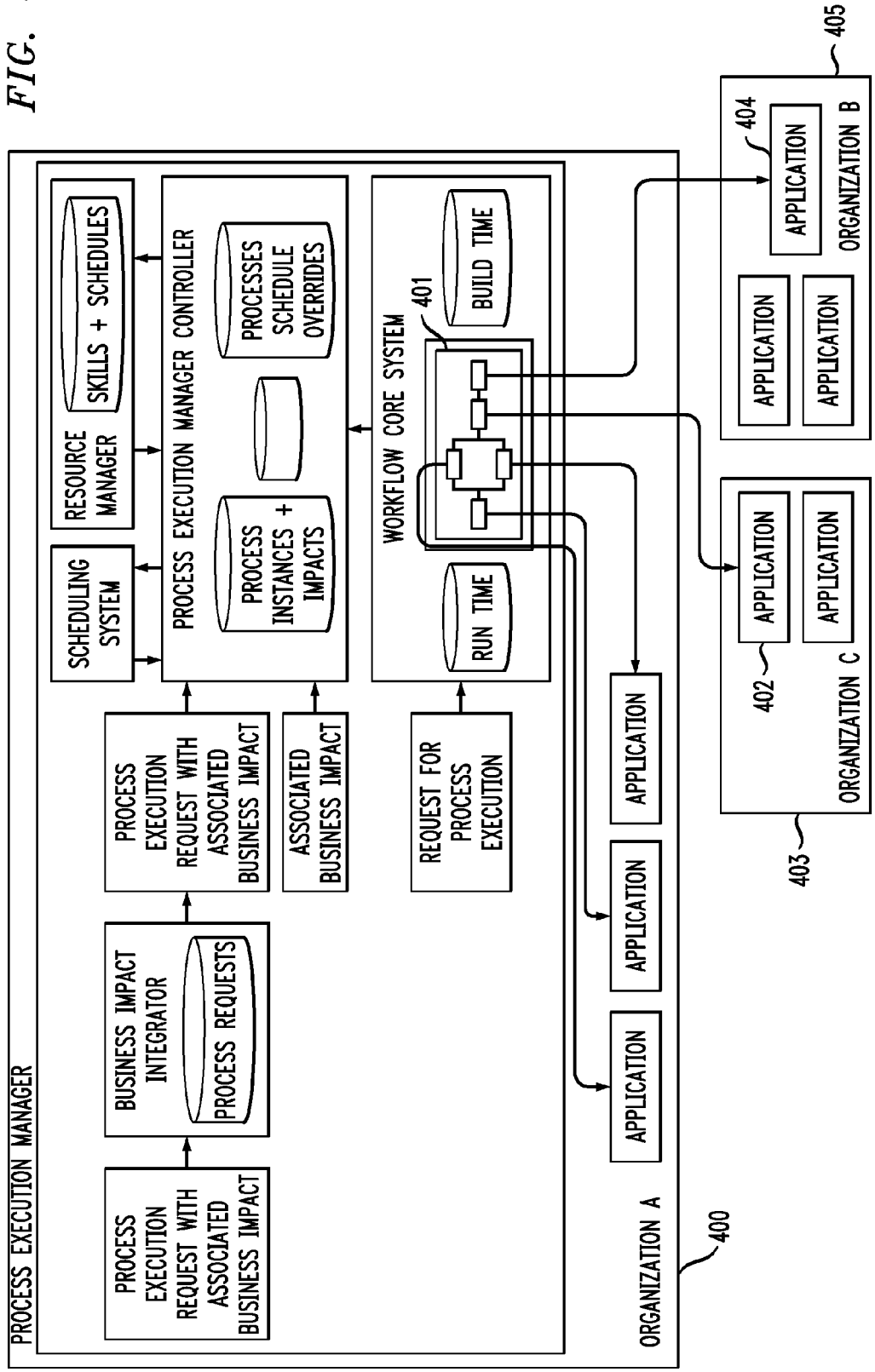
FIG. 4 is a high level block diagram of an exemplary process execution manager but in a cross organizational environment.

FIG. 4 illustrates an example of how the process execution manager 400 as depicted in FIG. 3 can be used to manage process instances 401 which cross the organization's boundaries. The process execution manager 400 can use information collected either from monitoring the external resources, e.g., Application $C_1$ 402 executing in external Organization C 403 or Application $B_3$ 404 executing in external Organization B 405, or obtained (e.g., possibly dynamically) from the organization owning the external resource, e.g., external Organization C 403 or external Organization B 405. Such information can be used by the framework to control the assignment of activities to external resources, where the external resource is to perform the activity. In the example of FIG. 4, application 402 is owned by Organization C 403, but Organization C 403 does not own the process execution manager 400 (e.g., a data processing system that implements the process execution manager 400).

Figure 5:
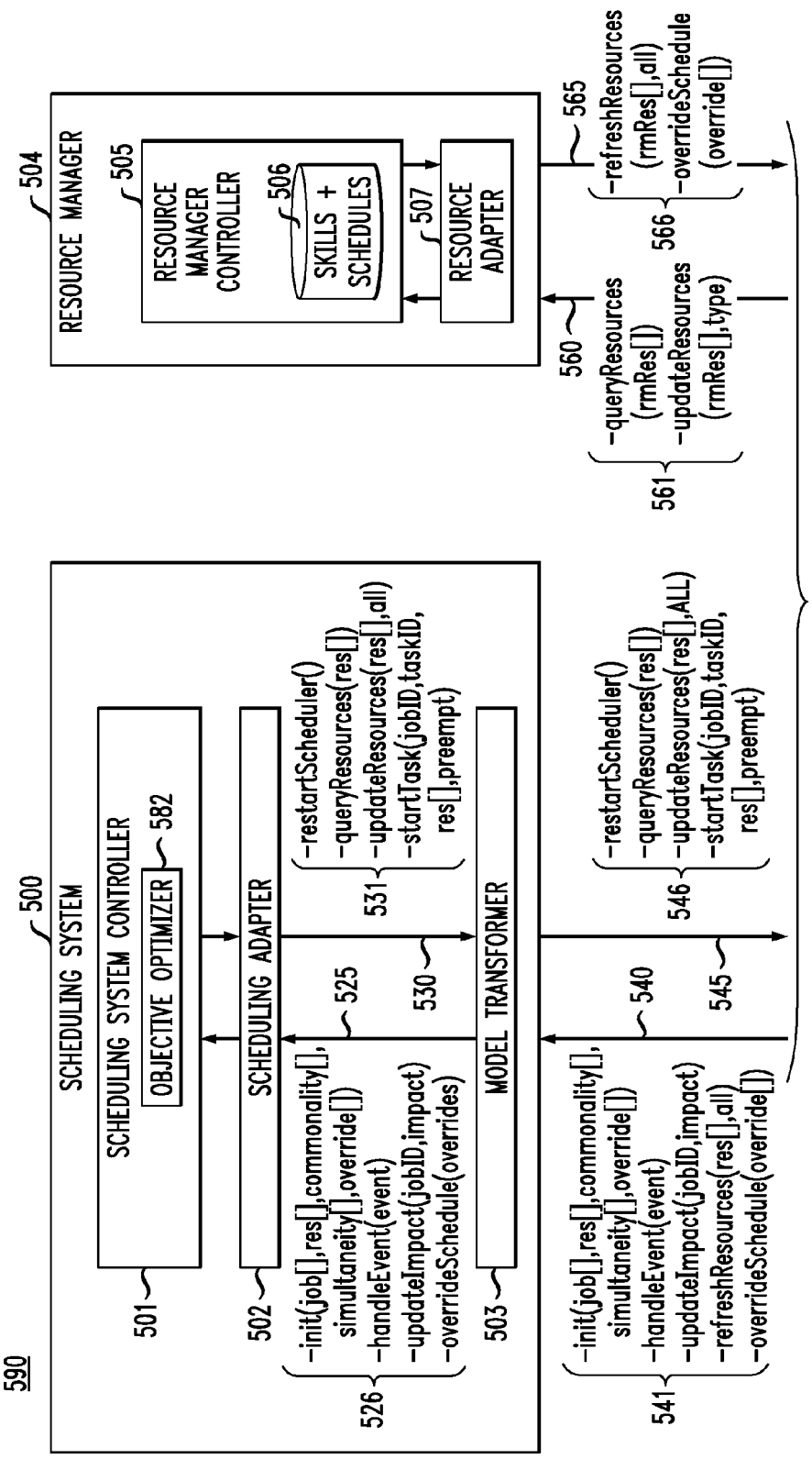
FIG. 5 is a block diagram of more detailed view of an exemplary process execution manager.
Figure 5:
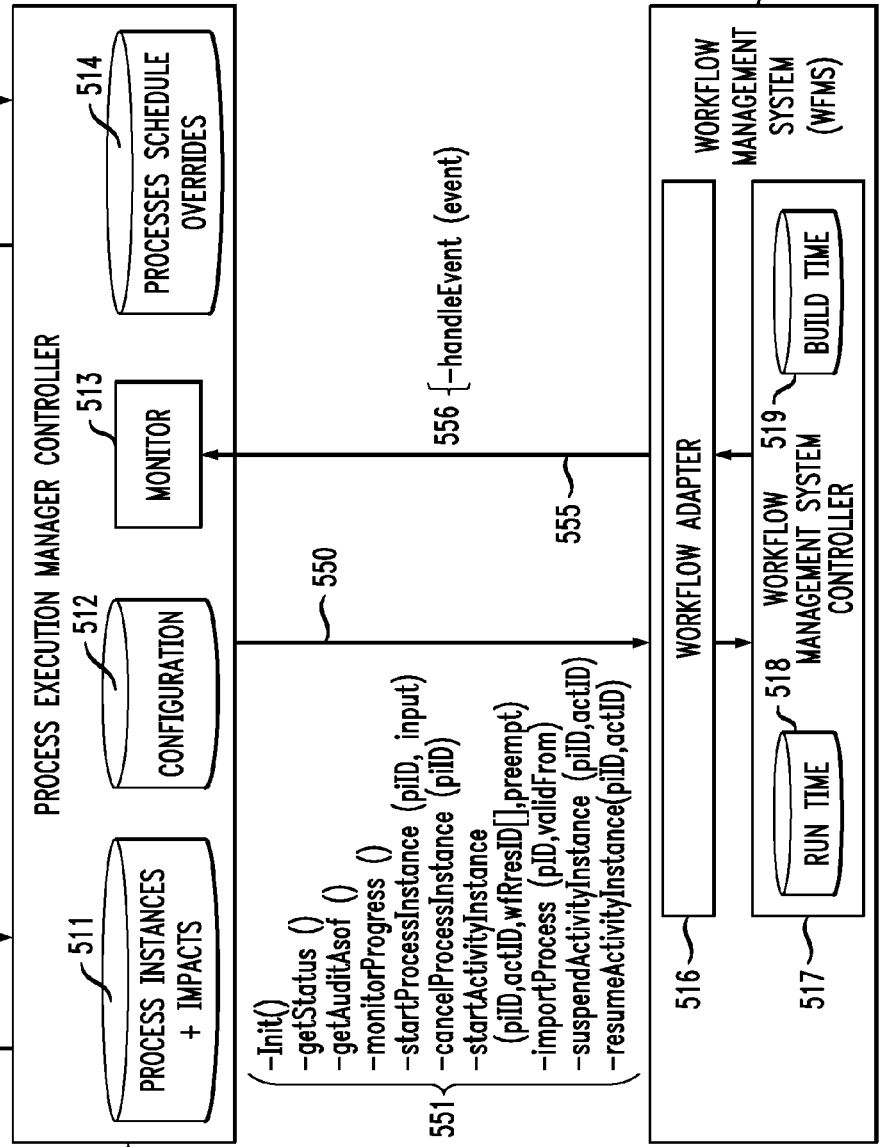

FIG. 5 is a block diagram of a more detailed view of an exemplary process execution manager 590. The process execution manager 590 comprises one or more scheduling systems 500, one or more resource managers 504, one or more business impact integrators 508, a process execution manager controller 510, and one or more WFMSs 515. Each scheduling system 500 comprises a model transformer 503 which interacts with a scheduling system adapter 502 which in turn interacts with a scheduling system controller 501. The scheduling system controller 501 comprises an objective optimizer 582 which is used to assign resources to activity instances in a manner which optimizes an objective. The process execution manager controller 510 interacts with the model transformer 503 for a scheduling system 500. A model transformer 503 may be used as an interface between a scheduling system 500 and another part of the process execution manager 590. For example, the WFMS 515 might support complex process models but the scheduling system 500 support simple process models. The model transformer 503 could then, to the extent possible, transform information about the complex process models into information suitable for use by the scheduling system 500.

For each resource manager 504, the process execution manager controller 510 interacts with a resource adapter 507 which in turn interacts with a resource manager controller 505. Similarly, for each WFMS 515, the process execution manager controller 510 interacts with a workflow system adapter 516 which in turn interacts with a WFMS controller 517. The process execution manager controller 510 also creates a monitor 513 for each WFMS 515 for tracking progress of process instances in the WFMS 515. The Application Programming Interface (API) methods 521, 526, 531, 541, 546, 551, 556, 561, 566, and 571 are defined for each of the interactions 520, 525, 530, 540, 545, 550, 555, 560, 565, and 570, respectively.

Requests regarding process instances (e.g., startProcessInstance in API 521) can be sent to the process execution manager controller 510 directly or through the business impact integrator 508. As previously described, the business impact integrator 508 can be used to add a default business impact or can weight or otherwise modify the business impacts associated with a process instance request. Additionally, the business impact integrator 508 can combine related process instance requests into a single request and aggregate, weight, or both associated business impacts into a single business impact. The business impact integrator 508 can also alter the process requested to a process which is more efficient (e.g., cost effective or timely) for an organization. The business impact integrator 508 can also combine and alter process instance requests into a single request for execution of another process, where the other process is more efficient for the business. The business impact integrator 508 maintains a store 509 of process requests, associated business impacts, and any combinations and alterations made.

The resource manager 504 (note that there may be multiple resource managers 504) is expected to maintain resource information required for scheduling (e.g., skills and schedules) in a store 506. The WFMS 517 (note that there may be multiple WFMSs 517) is expected to maintain information of processes and process instances in stores 518 and 519. The process execution manager controller 510 maintains a store 512 for information for configuration 512, a store 511 for process instances and their associated business impacts, and a store 514 for processes and scheduling overrides 514. A scheduling override overrides an assignment for a resource. For example, a manager may have a reason for wanting a particular employee to perform an activity for a particular process instance and therefore may choose to override the assignment by the scheduling system of that activity to another employee.

Figure 6:
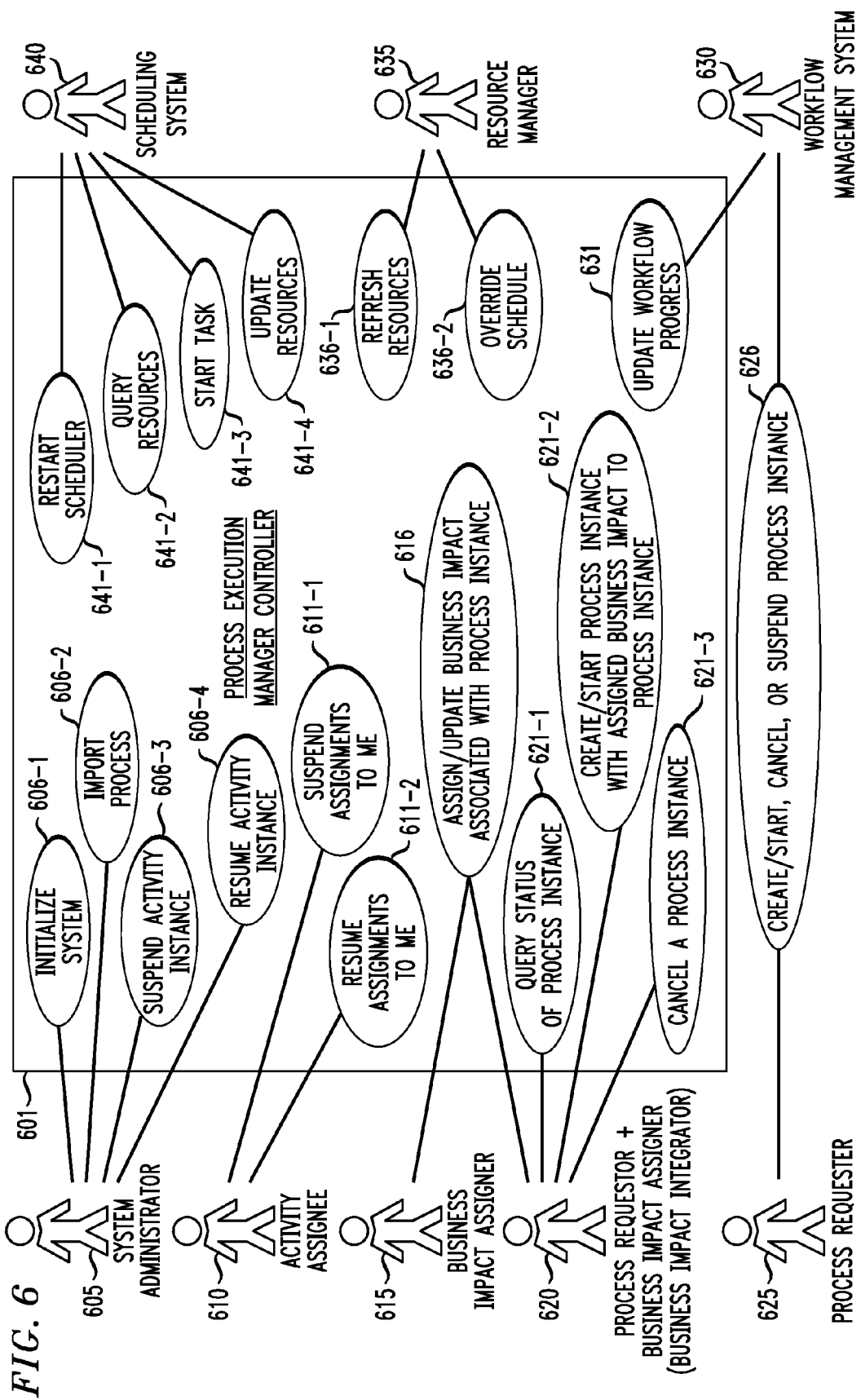
FIG. 6 is a use case diagram depicting potential uses of a process execution manager controller of an exemplary embodiment of the present invention.

Use cases for a process execution manager controller 601, such as the process execution manager controller 510 in FIG. 5, are illustrated in FIG. 6. The actors (e.g., humans, systems, and software agents) and their associated tasks are as follows:

(1) System administrator 605: initializes the process execution manager (step 606-1); imports a process template (step 606-2); suspends an activity instance (step 606-3); and resumes an activity instance (step 606-4).

(2) Activity assignee 610: suspends assignments to himself or herself (step 611-1); and resumes assignments to himself or herself (step 611-2).

(3) Business impact assigner 615: associates or updates a business impact with an instance (step 616).

(4) Business impact requester plus a business impact assigner (e.g., a business impact integrator) 620: associates or updates a business impact with a process instance (step 616); queries status of a process instance (step 621-1); creates or starts the execution of a process (step 621-2); and cancels a process instance (step 621-3).

(5) Process Requestor 625: creates and starts, cancels, and suspends a process instance (step 626) directly in the WFMS 630.

(6) Scheduling system 640: requests a refresh of all required information (step 641-1); queries about some or all resources (step 641-2); starts a task by assigning resource(s) to the task (e.g., possibly preempting other assignments) (step 641-3); and updates information about selected resource(s) (step 641-4).

(7) Resource manager 635: refreshes information for some or all resources (step 636-1); and overrides an assignment of resource(s) by a scheduling system to a task (step 636-2).

(8) WFMS 630: updates the progress of an instance (step 631).

Figure 7:
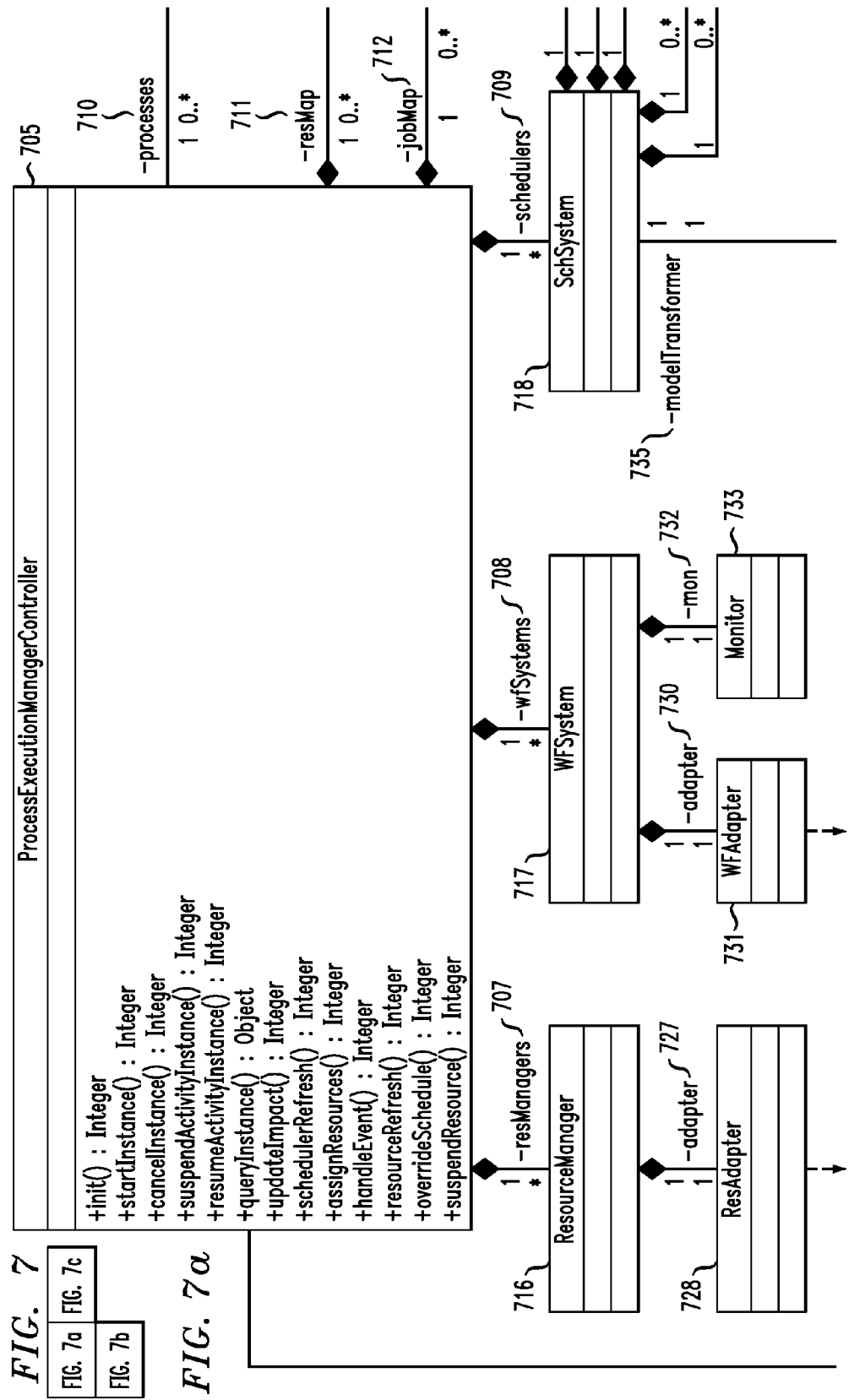
FIG. 7 is a class diagram for an illustrative framework suitable for implementing a process execution manager in accordance with an exemplary embodiment of the present invention.
Figure 7B:
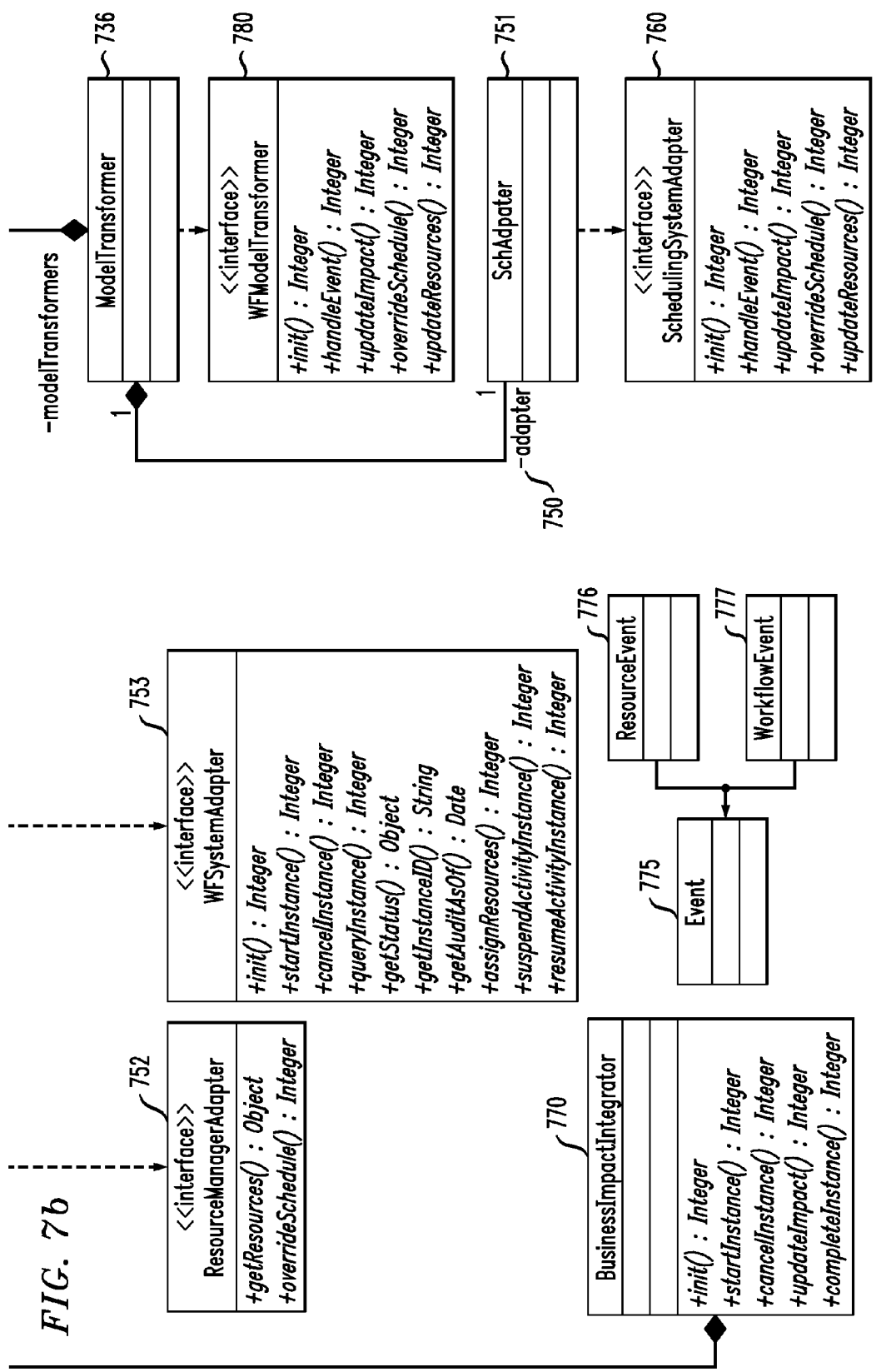
Figure 7C:
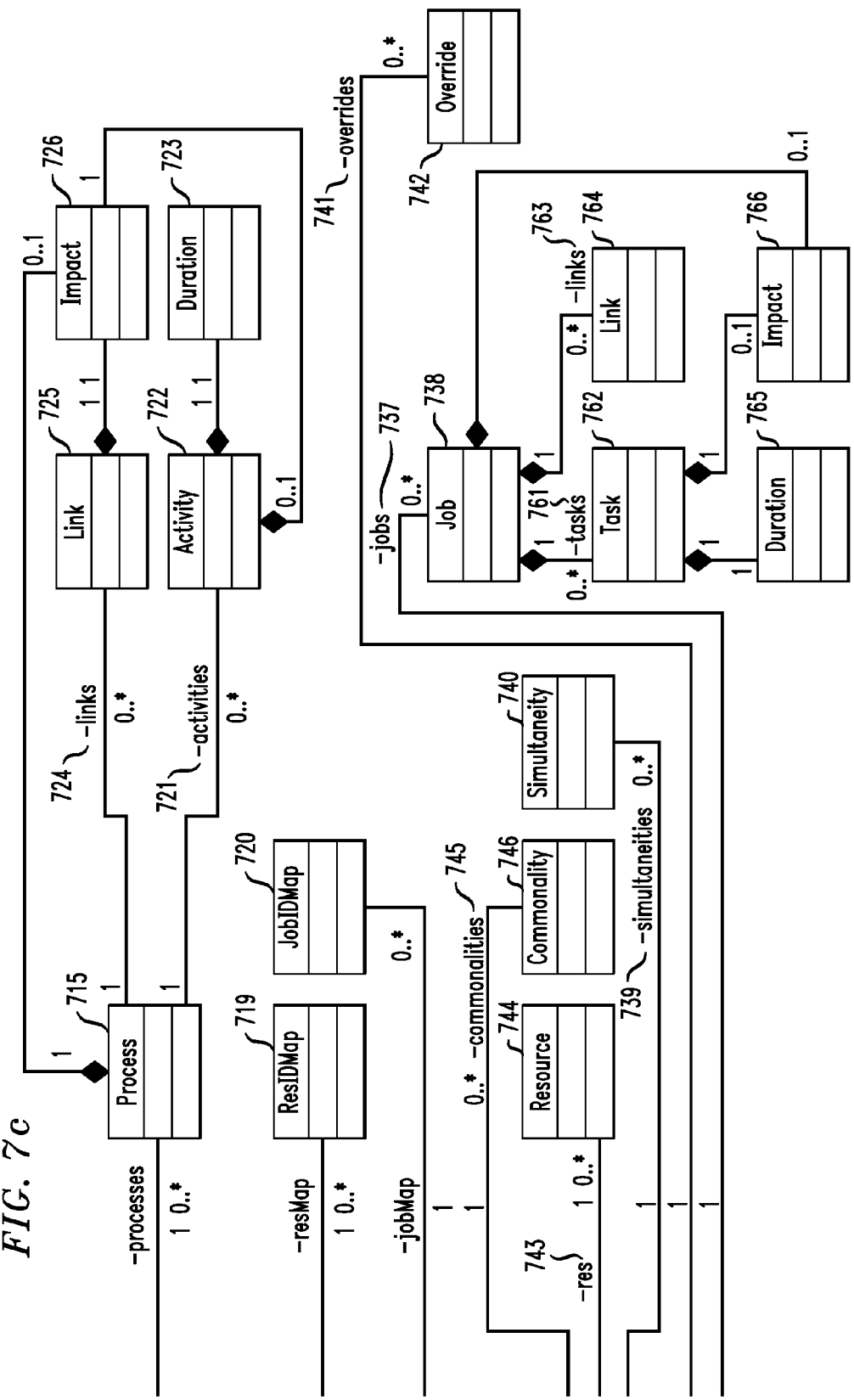

FIG. 7 illustrates an exemplary class diagram 700 for a framework suitable for implementing a process execution manager including a process execution manager controller 307, 510, or 601 and a business impact aggregator 301 or 506. The main class is the ProcessExecutionManagerController 705. An instance of the ProcessExecutionManagerController is a process execution manager controller and contains a list of:

(1) resource managers (resManagers 707, instances of ResourceManager 716);

(2) WFMSs managers (wfSystems 708, instances of WFSystem 717);

(3) scheduling systems managers (schedulers 709, instances of SchSystem 718);

(4) processes (processes 710, instances of Process 715);

(5) unique mappings between the process instance identifications (IDs) in the WFMSs and job IDs in the scheduling system (jobMap 712, instances of JobIDMap 720); and (6) unique mappings between the workflow resource IDs in the workflow systems and the resource IDs in the scheduling systems (resMap 711, instances of ResIDMap 719).

A process 715 contains a list of activities (activities 721, instances of Activity 722) and a list of links (links 724, an instance of Link 725) between activities. Each activity instance contains a duration (Duration 723). An impact (Impact 726) can be associated with a process instance or an activity instance. Each ResourceManager (resManagers 707, instances of ResourceManager 716) contains a resource adapter (adapter 727, an instance of ResAdapter 728) which implements the ResourceManagerAdapter interface 752 and is used by the ProcessExecutionManagerController 705 to interact with the resource manager (ResourceManager 716). Each workflow system manager instance (wfSystems 708, instances of WFSystem 717) contains the name of a workflow adapter (adapter 730, and instance of WFAdapter 731) which implements the WFSystemAdapter interface 753 and is used by the ProcessExecutionManagerController 705 to interact with the workflow system manager and a monitor (monitor 732, an instance of Monitor 733) which is used to monitor progress in the WFMS (e.g., 708).

Each scheduling system manager (schedulers 709, instances of SchSystem 718) contains the name of a model transformer (modelTransformer 735, an instance of ModelTransformer 736) and a scheduling system adapter (adapter 750, an instance of SchAdapter 751). The ProcessExecutionManagerController 705 interacts with the model transformer (e.g., 736) which in turn interacts with the scheduling system adapter (e.g., 751). The SchedulingSystemAdapter class 760 defines a programming interface which should be supported by any scheduling system adapter integrated with the ProcessExecutionManager framework 700. The WFModelTransformer class 780 defines a programming interface which should be supported by any model transformer integrated with the ProcessExecutionManager framework 700.

Each scheduling system manager (schedulers 709, instances of SchSystem 718) also contains a list of jobs (jobs 737, instantiated from Job 738), resources (res 743, instantiated from Resource 744), overrides (overrides 741, instantiated from Override 742), commonalities (commonalities 745, instantiated from Commonality 746), and simultaneities (simultaneities 739, instantiated from Simultaneity 740) which the scheduling system manager (schedulers 709, instances of SchSystem 718) uses for scheduling purposes Each job 738 may contain a business impact (Impact 766), a list of tasks (tasks 761, instantiated from Task 762), and a list of links between tasks (links 763, instantiated from Link 764) Each task (Task 762) contains a duration (Duration 765) and optionally a business impact (Impact 766).

The framework 700 also contains a class for a business impact integrator 770 which is used to aggregate related requests for the execution of a process into a single request and to aggregate, weight, or both associated business impacts for the similar requests into a single business impact (e.g., associated then with the single request). The business impact integrator 770 can also be used to assign default business impacts to requests for the execution of a process or to weight requests for some business purpose (e.g., to give preference to a certain types of requests or to requests from particular customers). Additionally, a business impact integrator 770 can be used to alter request for process execution, individual or combined, to a request for another process with aggregated business impact for cost and efficiency purposes.

Classes are also specified for a ResourceEvent 776, a WorkflowEvent 777 and a generalized Event 775. These are used to inform the ProcessExecutionManagerController 705 and SchSystem 718 of events (e.g., Event 775) regarding resource changes (e.g., ResourceEvent 776) or workflow progress (WorkflowEvent 705).

FIGS. 8-24 are high level flow diagrams for each of the use cases in FIG. 6. Each figure shows a method and each method has an illustrative assigned name in pseudocode. During the description of FIGS. 8-24, please refer to FIGS. 5 and 7 also.

Figure 8:
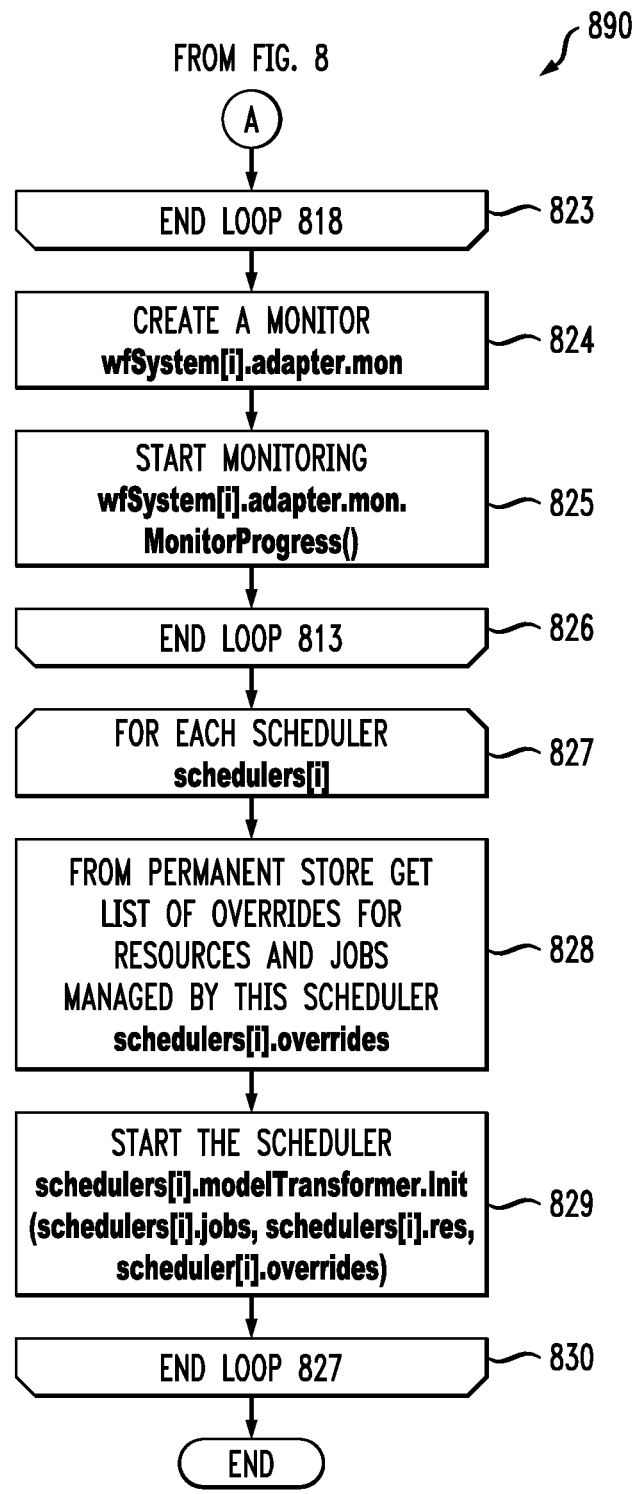
FIG. 8 is a flowchart of a method for the initialization of a module illustratively referred to as the ProcessExecutionManagerController, in accordance with an exemplary embodiment of the present invention.

With reference to FIG. 8, the initialization of a module illustratively referred to as the ProcessExecutionManagerController (e.g., ProcessExecutionManagerController 705, which will be assumed during the upcoming description) is shown in accordance with an exemplary embodiment of the present invention. The method 890 shown in FIG. 8 may be illustratively named, in pseudocode, as PEMC init( ). When initialized, the ProcessExecutionManagerController 705 will read configuration data in the persistent store (e.g., configuration store 512 of FIG. 5). This occurs in step 800. In step 801, the ProcessExecutionManagerController 705 will create a list of scheduling systems (e.g., schedulers 709) to be supported including the adapter (e.g., adapter 730) and model transformer (e.g., modelTransformer 7:35) to be used for each scheduling system. In step 802, a list of WFMSs (e.g., wfSystems 708) is created including the appropriate adapter to be used for each workflow system. In step 803, a list of resource managers (e.g., resManagers 707) is created including the adapter to be used for each resource manager. In step 804, an empty list of processes (e.g., processes 710) currently being managed is created. A map (e.g., jobMap 712) of scheduling system job IDs to workflow system job IDs is created from information in the store (e.g., Process Instances+Impacts store 511 of FIG. 5). This occurs in step 805.

In steps 806-812, a list of resource IDs along with an associated scheduler IDs and workflow resource IDs which are to be managed by each scheduling system is determined from the resource manager (e.g., resManagers 707). Step 806 ("for each resource manager resManagers[i]") begins a loop that ends in step 812. In step 807, the list of resource IDs, associated scheduler ID and workflow resource ID information is added to the resource map (e.g., ResMap 711) maintained by the ProcessExecutionManagerController 705. In step 807, the pseudocode for determining a list of resources associated with schedulers and workflow resource IDs is res=resManagers[i].adapter getResources In step 808, the resource IDs are added to resMap 711 along with a matching ID in the WFMS. The resource information is added to each of the appropriate schedulers in steps 809-811. Step 809 starts a loop ("for each scheduler, schedulers[j]") that ends in step 811. In step 810, resources in res which are scheduled by the currently selected scheduler (e.g., schedulers 709) are added to schedulers[j].res.

Step 813 starts a loop ended in step 826. For each WFMS (e.g., "for each wf system wfSystems[i]" in step 813) steps 814-825 are performed. In step 814, a timestamp is determined for a last event recorded in an audit trail (e.g., "get end date of recorded audit trail, auditDate=wfSystem[i].adapter.getAuditAsOf( )" in step 814). In step 815, a list is determined of currently active jobs process instances (e.g., "get info on running jobs, jobs=wfSystem[i].adapter.getStatus (auditDate)" in step 815).

In step 816, a map (e.g., jobMap 712) is updated as needed, where the map is of scheduling system job IDs to workflow system process instance IDs. In step 817, any newly encountered processes are added to the list of processes (e.g., processes 710). Step 818 starts a loop for each job, jobs[j], and this loop ends in step 823. Step 819 starts a loop for each scheduler, schedulers[j], and this loop ends in step 822. Thus, for each job in steps 818-823 and each scheduler in steps 819-822, if the job requires resources managed by the scheduler (step 820, written as "jobs[j] uses resources in scheduler [i].res?" in FIG. 8), information on the job is added to the scheduler (step 821, written as "add jobs[j], to schedulers[i].jobs" in FIG. 8).

In step 824, a monitor for this WFMS (e.g., "create a monitor wfSystem[i].adapter.mon"), and progress is monitored in step 825 (e.g., "Start monitoringwfSystem[i].adapter.mon.monitorProgresso". Finally, step 827 starts a loop performed for each scheduler, schedulers[i], that ends in step 830. For each scheduler, get a list of overrides from the store (e.g., store 514 of FIG. 5) for resources and jobs managed by this scheduler (step 828). Additionally, the scheduler is initialized with the jobs, resources, and override information, written in pseudocode as the following: schedulers[i].modelTransformer.init (schedulers[i].jobs, schedulers[i].res, scheduler[i].overrides)"). Method 890 ends after step 830.

Figure 9:
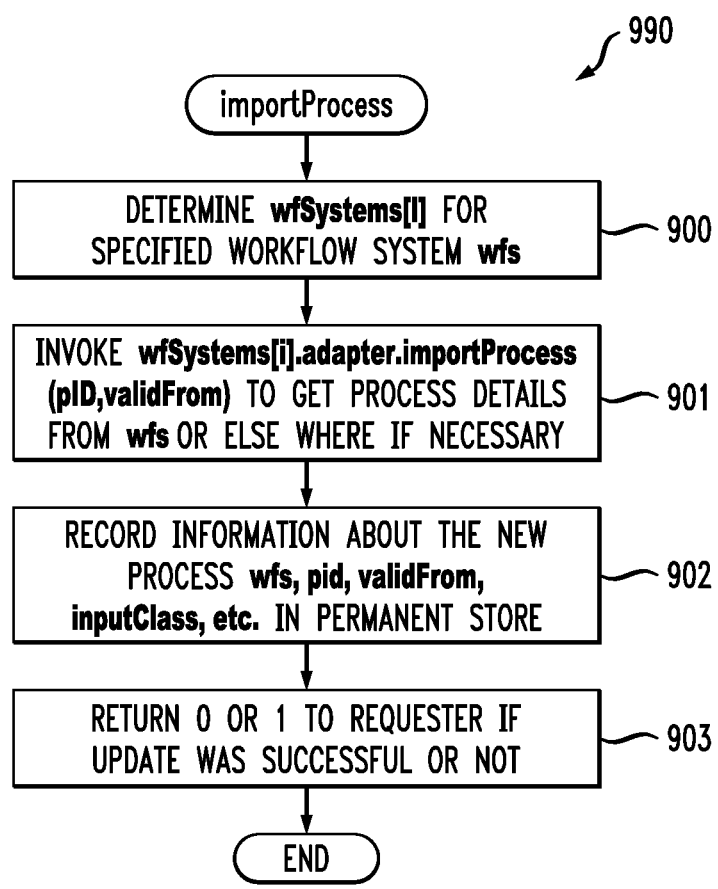
FIG. 9 is a flowchart of a method for importing a process, in accordance with an exemplary embodiment of the present invention.

With reference to FIG. 9, a method 990 for importing a process is illustrated in accordance with an exemplary embodiment of the present invention. In pseudocode, the method 890 shown in FIG. 9 may be illustratively named PEMC.importProcess (wfs, pID, validFrom, inputClass). The input parameters specify the WFMS, the process ID, the "valid from" date (e.g., used to differentiate versions of a process), and the name of a class which is used to prepare input for the execution of this process (e.g., defined by the process ID). Method 990 is used to import process information required by the ProcessExecutionManagerController 705 as well as metadata required by one or more schedulers into the store for (e.g., Processes store 514 of FIG. 5).

The first step (step 900) of method 990 is to match the WFMS specified with one of those supported (shown as "determine wfSystems[i] for specified workflow system wfs" in step 900 of FIG. 9). In step 901, the workflow adapter for this WFMS is invoked to load the basic process information needed by the ProcessExecutionManagerController 705. This is described as "invoke wfSystems[i] adapter.importProcess (pID, validFrom) to get process details from wfs or elsewhere if necessary" in step 901 of FIG. 9. Metadata about the new process is stored in a store (e.g., store 514 of FIG. 5) in step 502, written as "record information about the new process wfs, pid, validFrom, inputClass, etc. in permanent store." In step 903, a zero (e.g., successful) or one (e.g., unsuccessful) is returned to a requestor if the update was successful or was not successful, respectively. Method 990 ends after step 903.

Figure 10:
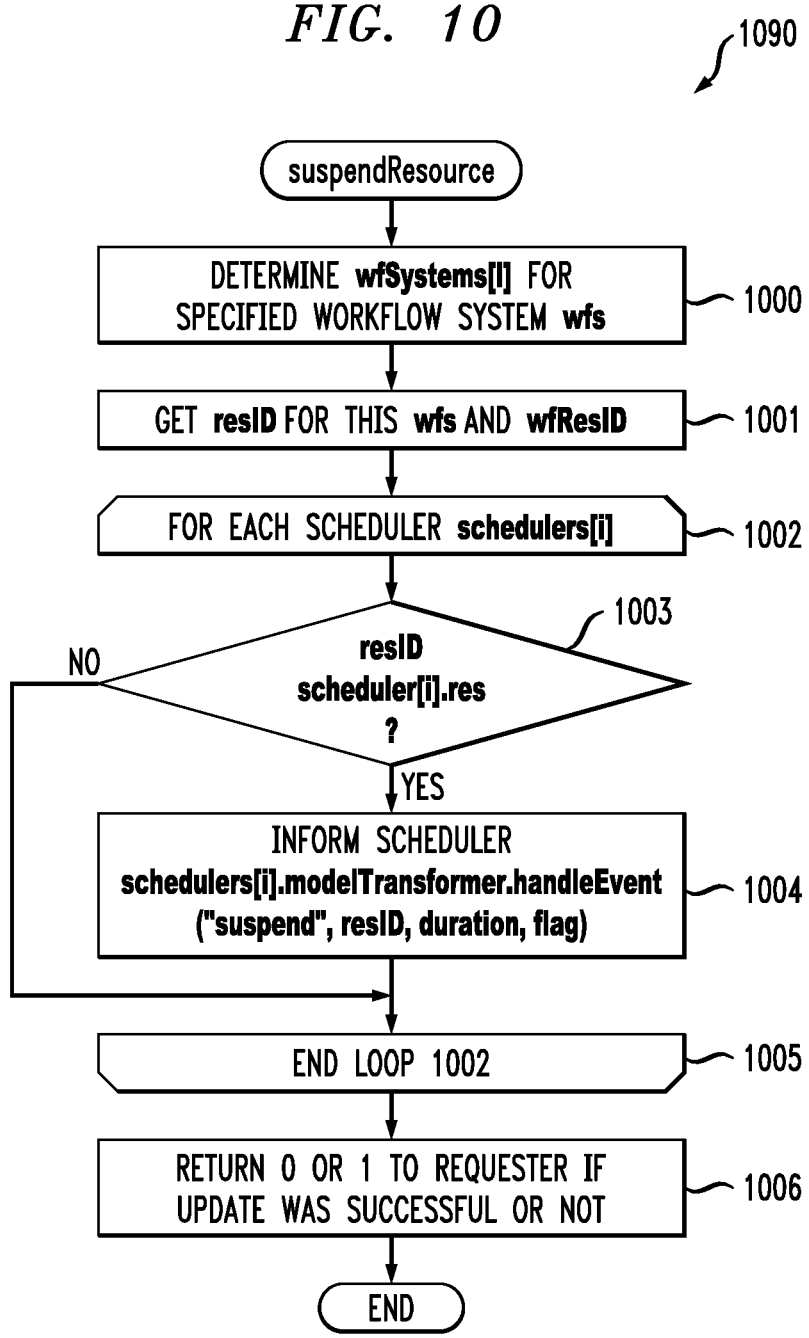
FIG. 10 is a flowchart of a method for suspending a resource in accordance with an exemplary embodiment of the present invention.

With reference to FIG. 10, a method 1090 for suspending a resource is illustrated in accordance with an exemplary embodiment of the present invention. The method 1090 shown in FIG. 10 may be illustratively named in pseudocode as PEMC.suspendResource (wfs, wfResID, duration, flag). The input parameters specify the WFMS, the workflow resource ID, a duration during which the resource will not be available and a flag indicating how the current assignment, if any, is to be handled (e.g., allow resource to complete the current assignment before beginning suspension, re-assign the current assignment to another resource, or hold this assignment for this resource). The method 1090 is intended to allow a human resource to inform the scheduler of an unscheduled period of unavailability.

The first step (step 1000) in method 1090 is to match the WFMS specified with of those supported, which is a step of determining a wfsystems[i] for a specified WFMS, wfs. In step 1001, the appropriate resource ID is obtained for the specified workflow resource ID (e.g., "get resID for this wfs and wfResID"). Step 1002 starts a loop performed for each scheduler (schedulers[i]), and the loop ends in step 1005. In step 1003, it is determined if this resource is managed by the scheduler (shown as "resIDscheduler[i].res?" in FIG. 10). If not (step 1003=No), the method 1090 continues in step 1005. If so (step 1003=Yes), step 1004 is performed and the handleEvent method of a model transformer and adapter is used to send a "suspend event" for this resource to the scheduler. Pseudocode for informing a scheduler is written as the following in step 1004: scheduler's[i].modelTransformer handleEvent ("suspend", resID, duration, flag). In step 1006, a zero (e.g., successful) or one (e.g., unsuccessful) is returned to a requestor if the suspend resource was successful or was not successful, respectively. Method 1090 ends after step 1006.

Figure 11:
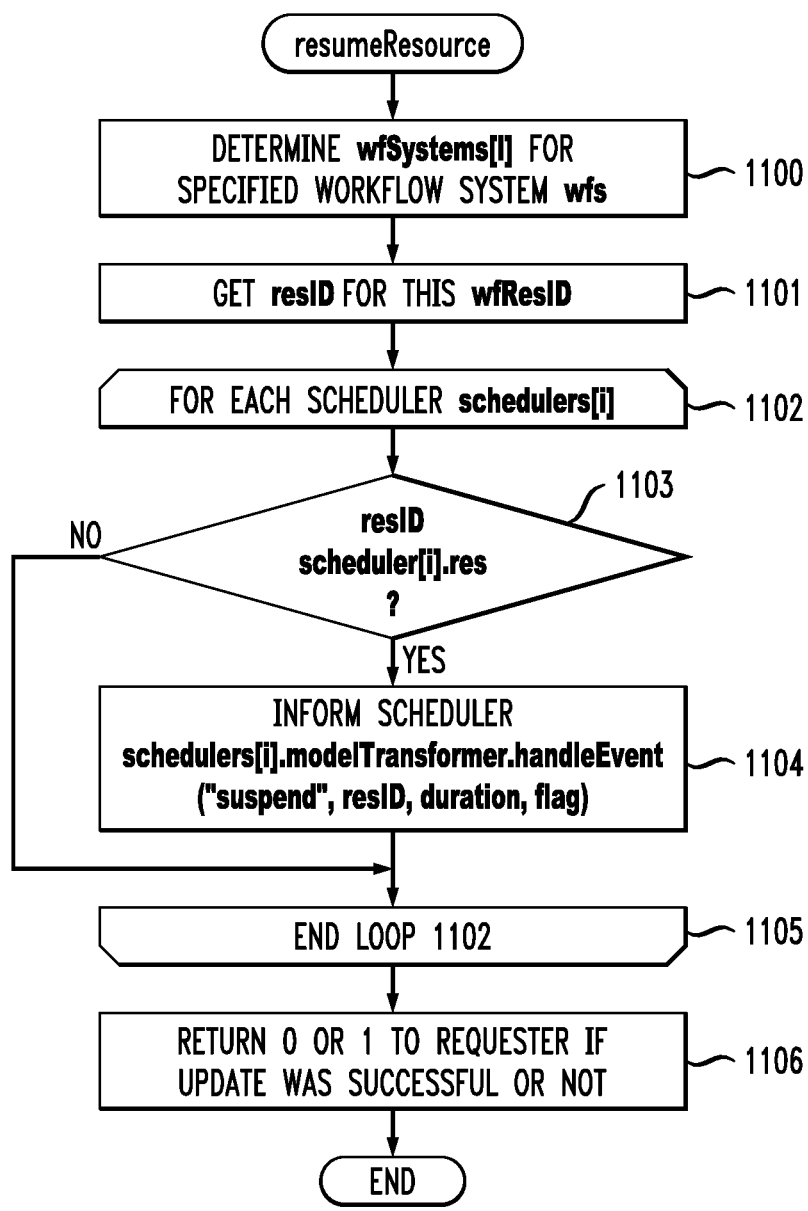
FIG. 11 is a flowchart of a method for resuming a resource in accordance with an exemplary embodiment of the present invention.

With reference to FIG. 11, a method 1190 for resuming a resource is illustrated in accordance with an exemplary embodiment of the present invention. The method 190 shown in FIG. 11 may be illustratively named as PEMC resumeResource (wfs, wfResID). The input parameters specify the WFMS and the workflow resource ID. This method is intended to allow a resource to inform the scheduler of his or her availability after an unscheduled period of unavailability.

The first step (step 1100) is to match the WFMS specified with one that is supported, e.g., determining a wfSystems[i] for a specified workflow system, wfs. In step 1101, the appropriate resource ID, resID, is obtained for the specified workflow resource ID, wfResID. Step 1102 begins a loop performed for each scheduler, schedulers[i], and the loop ends in step 1105. For each scheduler in steps 1102-1105, if this resource is managed by the scheduler (step 1103, written in pseudocode as "resID scheduler[i].res?"), the handleEvent method of the model transformer and adapter is used to send a "resume event" for this resource to the scheduler in step 1104. Informing the scheduler in pseudocode is written as the following: schedulers[i].modelTransformer.handleEvent ("suspend", resID, duration, flag). In step 1106, a zero (e.g., successful) or one (e.g., unsuccessful) is returned to a requester if the resume resource was successful or was not successful, respectively. Method 1190 ends after step 1106.

Figure 12:
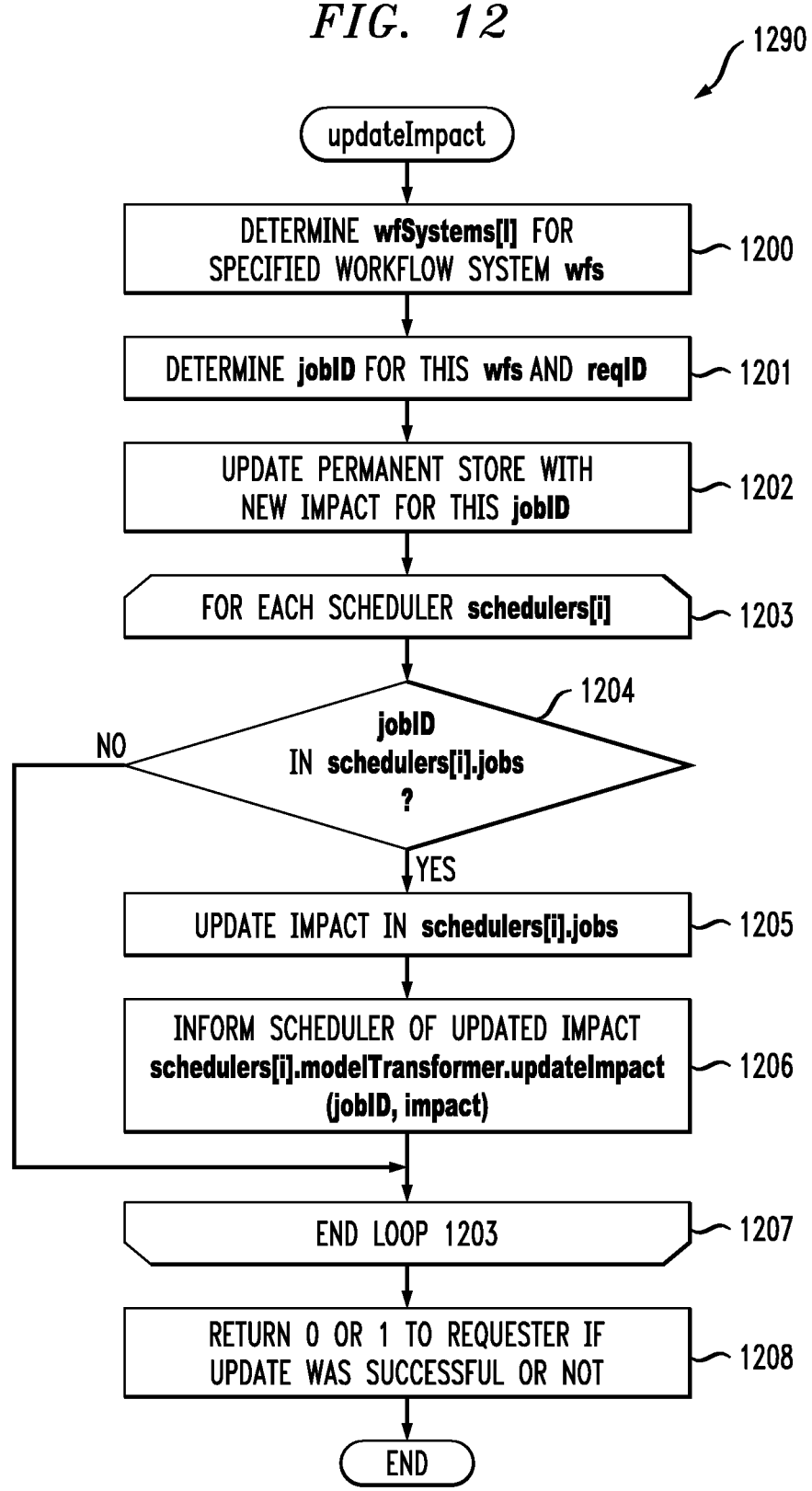
FIG. 12 is a flowchart of a method for updating the business impacts for a process instance and its activity instances, in accordance with an exemplary embodiment of the present invention.

Turning now to FIG. 12, a method 1290 for updating impact for a process instance is illustrated in accordance with an exemplary embodiment of the present invention. The method 1290 of FIG. 12 may be illustratively named PEMC.updateImpact (wfs, piID, impact). The input parameters specify the WFMS, the process instance ID, and the business impact. Method 1190 allows the association of a business impact with a process instance not started by the ProcessExecutionManagerController 705, the update of a business impact for any process instance, or both.

The method 1290 begins in step 1200, when the WFMS ID, wfs, is matched with one of those supported, e.g., determining wfSystems[i] for specified WFMS, wfs. In step 1201, a unique job ID, jobID, assigned to this process instance is determined based on the wfs and reqID. The business impact and job ID are stored in step 1202 in a store (e.g., store 511 of FIG. 5). Step 1203 begins a loop for each scheduler, sch[i], and the loop ends in step 1207. Thus, for each scheduler in steps 1203-1207, check if this job is being managed by the scheduler in step 1204 (in pseudocode, "jobID in schedulers [i].jobs?") If the job is not being managed by the scheduler (step 1204=No), select another scheduler (step 1207). If the job is being managed by the scheduler (step 1204=Yes), then update the information (e.g., including business impact) in the list of scheduler's (e.g., schedulers[i].jobs) for that scheduler in step 1205. In step 1206, the updateImpact method of the model transformer is performed to inform that scheduler of the update via the scheduling system adapter, shown in pseudocode as "schedulers[i].modelTransformer,updateImpact (jobID, impact)". In step 1208, a zero (e.g., successful) or one (e.g., unsuccessful) is retuned to a requestor if the update to the business impact was successful or was not successful, respectively. Method 1290 ends after step 1208.

Figure 13:
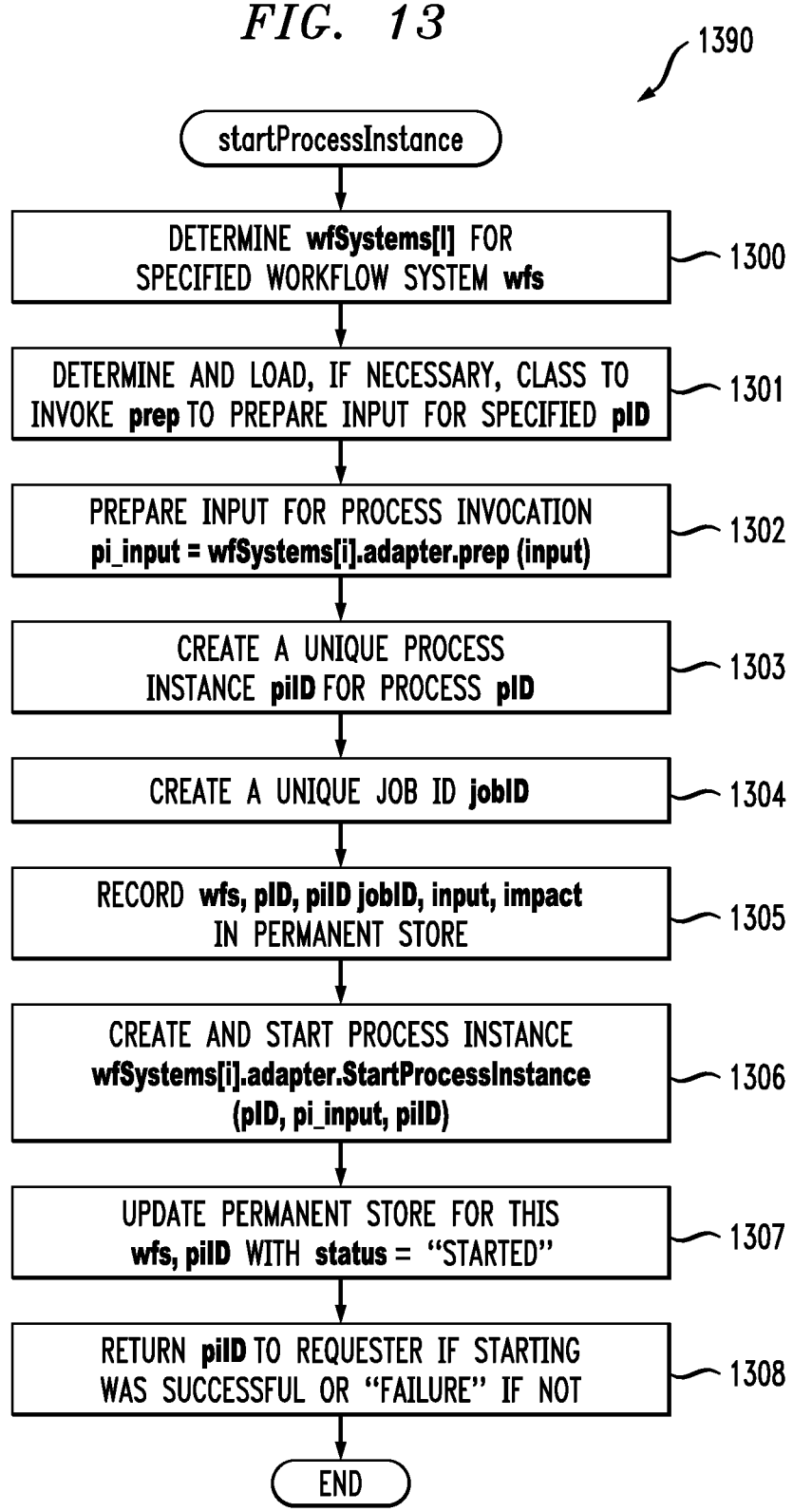
FIG. 13 is a flowchart of a method for starting a process instance, in accordance with an exemplary embodiment of the present invention.

With reference to FIG. 13, a method 1390 for starting a process instance is illustrated in accordance with an exemplary embodiment of the present invention. The method 1390 shown in FIG. 13 may be illustratively named in pseudocode as PEMC.startProcessInstance (wfs, pID, input, impact). The input parameters specify the WFMS, the process ID, the input for the process, and a business impact. Method 1390 is used to request that the ProcessExecutionManagerController 705 start an instance of a specified process with given input and associate a business impact with that process instance.

The first step (step 1300) in method 1390 is to match the WFMS specified with of those supported, which is a step of determining a wfSystems[i] for a specified WFMS, wfs. In step 1301, it is determined which class prepares the input for the execution of the process (e.g., defined by the pID) and the class (e.g., prep) is loaded, if necessary. In step 1302, the class is invoked with the specified input to prepare the input for the workflow system execution. In pseudocode, this is shown as pi_input=wfSystems[i].adapter prep (input).

In step 1303, a unique process instance ID, piID is created for the process ID, pID In step 1304, a unique job ID, jobID, is also created for the process ID. In step 1305, information (e.g., wfs, pID, piID, jobID, input, impact) is recorded about this process instance in a store such as store 511 of FIG. 5. The next step (step 1306) is to invoke the startProcessInstance method of the workflow adapter to start the process instance with the prepared input data In pseudocode, this is wfSystems [i].adapter.startProcessInstance (pID, pi_input, piID). Next, the store (e.g., store 511 in FIG. 5) is updated with a status of "started" for this process instance (defined by wfs and piID). The process instance ID is returned to the requester in step 1308 if the starting of the process instance was successful. If the starting of the process instance was not successful, "FAILURE" is returned to the requester in step 1308.

Figure 14:
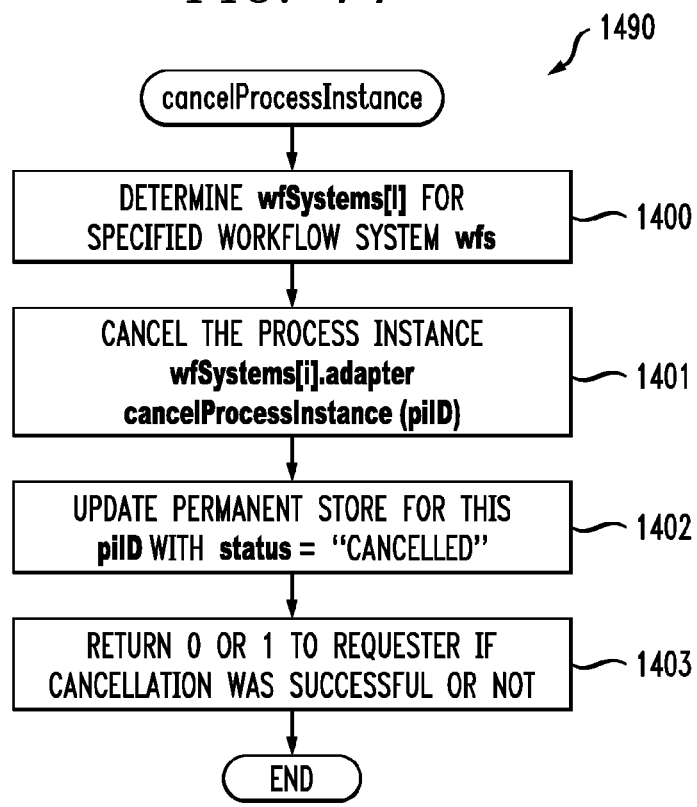
FIG. 14 is a flowchart of a method for canceling a process instance in accordance with an exemplary embodiment of the present invention.

With reference to FIG. 14, a method 1490 for canceling a process instance is illustrated in accordance with an exemplary embodiment of the present invention. The method 1490 may be illustratively named in pseudocode as PEMC.cancelProcessInstance (wfk, piID). The input parameters specify the WFMS and a unique process instance ID. Method 1490 is used to request that the ProcessExecutionManagerController 705 cancel the specified process instance (e.g., defined by the piID) in the specified workflow system (e.g., defined by wfs).

The first step (step 1400) in method 1490 is to match the WFMS specified with of those supported WFMSs, which is a step of determining a wfsystems[i] for a specified WFMS, wfs. In step 1401, a cancelProcessInstance method is used for the workflow adapter for the specified WFMS. In pseudocode, this may be written as wfSystems[i].adapter.cancelProcessInstance (piID). In step 1402, a store (e.g., store 511) is updated for the specified process instance ID (e.g., piID) in the specified workflow with a status of "cancelled." In step 1403, a zero (e.g., successful) or one (e.g., unsuccessful) is returned to a requestor if the canceling of the process instance was successful or was not successful, respectively. Method 1490 ends after step 1403.

Figure 15:
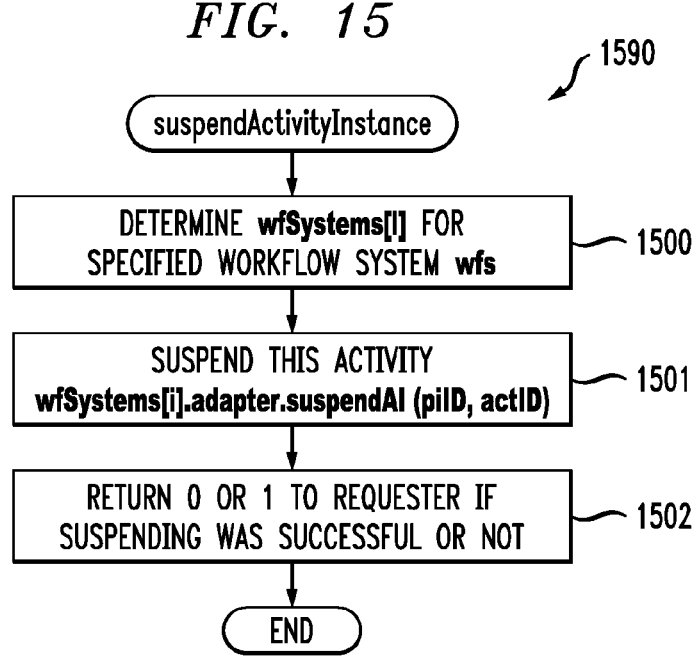
FIG. 15 is a flowchart of a method for suspending an activity instance in accordance with an exemplary embodiment of the present invention.

Turning now to FIG. 15, a method 1590 for suspending an activity instance is illustrated in accordance with an exemplary embodiment of the present invention. The method 1590 may be illustratively named in pseudocode as PEMC suspendActivityInstance (wfs, piID, actID). The input parameters specify the WFMS, a unique process instance ID, and an activity ID. Method 1590 is used to request that the ProcessExecutionManagerController 705 suspend the specified activity instance (e.g., defined by the piID and the actID) in the specified WFMS (e.g., defined by wfs).

The first step (step 1500) in method 1590 is to match the WFMS specified with one of those supported WFMSs, which is a step of determining a wfSystems[i] for a specified WFMS, wfs. The next step (step 1501) is to invoke the suspendactivityInstance (indicated as "suspendAI" in FIG. 15) method of the workflow adapter with the activity instance information. In pseudocode, this may be written as wfSystems[i].adapter.suspendActivityInstance (piId, actID, flag). In step 1502, a zero (e.g., successful) or one (e.g., unsuccessful) is returned to a requestor if suspension of the activity instance was successful or not. Method 1590 ends after step 1502.

Figure 16:
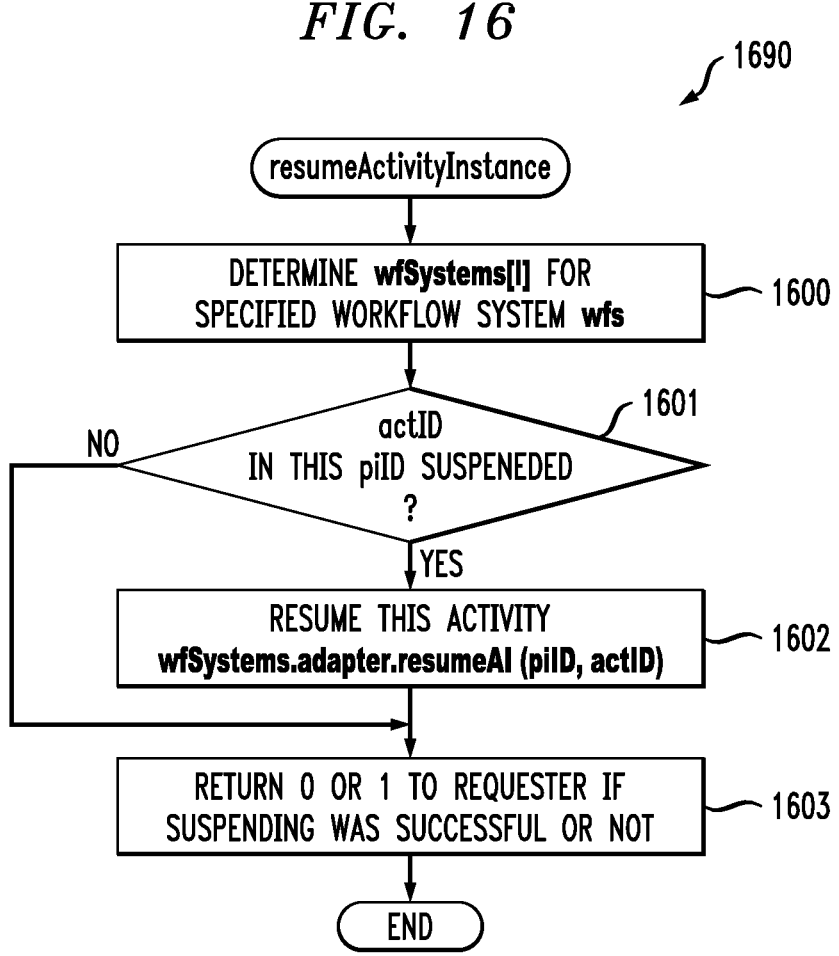
FIG. 16 is a flowchart of a method for resuming an activity instance, in accordance with an exemplary embodiment of the present invention.

With reference to FIG. 16, a method 1690 for resuming an activity instance is illustrated in accordance with an exemplary embodiment of the present invention. The method 1690 may be illustratively named in pseudocode as PEMC.resumeActivityInstance (wfs, piID, actID). The input parameters specify the WFMS, a unique process instance ID, and an activity ID. Method 1690 is used to request that the ProcessExecutionManagerController 705 resume the specified activity instance (e.g., defined by the piID and the actID) in the specified WFMS (e.g., defined by the wfs).

In step 1600, the specified WFMS is matched with one of those WFMSs supported, which is a step of determining a wfSystems[i] for a specified WFMS, wfs. In step 1601, a check is made to see if the activity is actually suspended. If not (step 1601=No), an error (e.g., a zero) is returned to the requester in step 1603. Otherwise (step 1601=Yes), a resumeActivityInstance method (indicated as "resumeAI" in FIG. 16) of a workflow adapter is invoked with the information about the activity instance. This occurs in step 1602 and may be written in pseudocode as wfSystem.adapter.resumeActivityInstance (piId, actID). In step 1603, a zero (e.g., successful) or one (e.g., unsuccessful) is returned to a requestor if resumption of the process instance was successful or was not successful, respectively. Method 1690 ends after step 1603.

Figure 17:
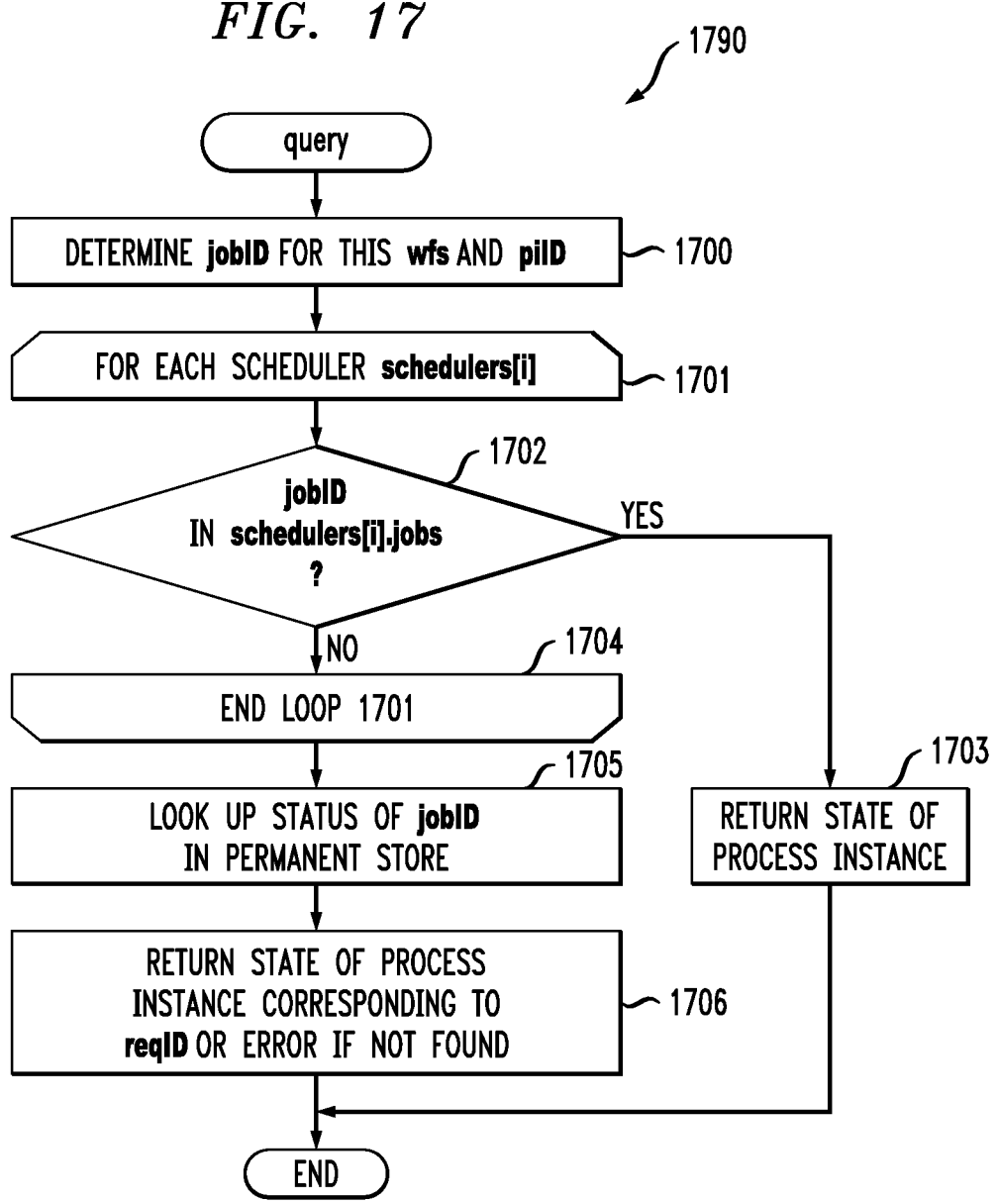
FIG. 17 is a flowchart of a method for querying a process instance, in accordance with an exemplary embodiment of the present invention.

Turning now to FIG. 17, a method 1790 for querying a process instance is illustrated in accordance with an exemplary embodiment of the present invention. The method 1790 may be illustratively named in pseudocode as PEMC query (wfs, piID). The input parameters specify the WFMS and a unique process instance ID. Method 1790 is used to query the ProcessExecutionManagerController 705 for the current status of the specified process instance in the specified WFMS.

In step 1700, a job ID is determined for the specified WFMS (e.g., defined by wfs) and process instance ID. Step 1701 begins a loop that examines each scheduler (scheduler [i]) and that ends in step 1704. Thus, for each scheduler, check if the jobID corresponds to one of the managed jobs (schedulers[i].jobs) in step 1702. If yes (step 1702=Yes), the state is returned for this job in step 1703 and the method 1790 ends. If the process instance is not one of the active jobs (step 1702=No), continue loop 1701-1704 checking other schedulers. If all schedulers are checked and the job is not found in any of them, then look up status of the job in the store (e.g., store 511 of FIG. 5) in step 1705. The state of the job found in the store or an error if the job was not found in the store is returned (step 1706) to the requestor. Method 1790 ends after step 1706.

Figure 18:
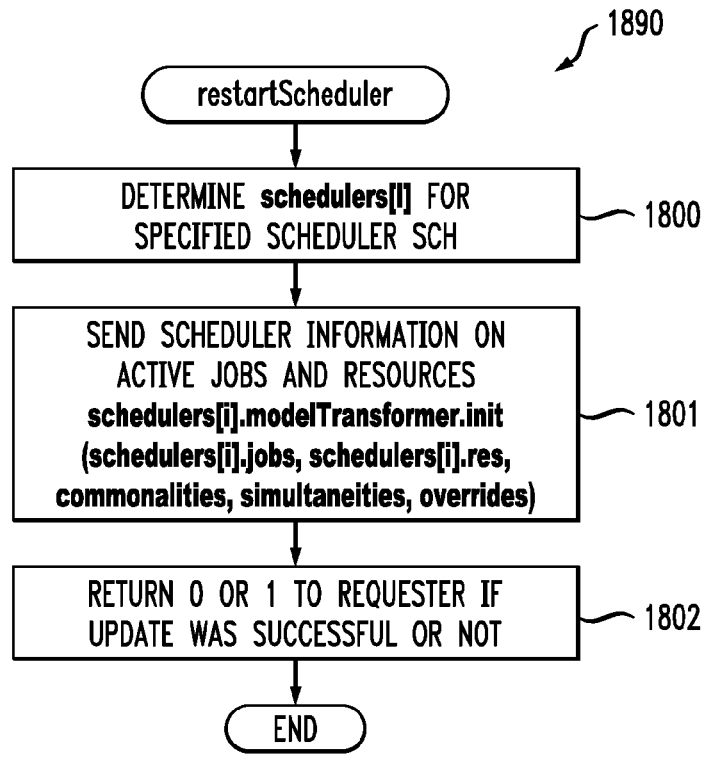
FIG. 18 is a flowchart of a method for requesting a restart of a scheduling system, in accordance with an exemplary embodiment of the present invention.

With reference to FIG. 18, a method 1890 for restarting a scheduler is illustrated in accordance with an exemplary embodiment of the present invention. The method 1890 may be illustratively named in pseudocode as PEMC.restartScheduler (sch). The input parameter specifies the scheduler. Method 1890 is used by a scheduling system (e.g., schedulers 709) to request that the ProcessExecutionManagerController 705 send all the information (e.g., information on jobs and resources) required by the scheduler to reinitialize.

The first step (step 1800) in method 1890 is to match the WFMS specified with one of those supported WTMSs, which is a step of determining a wfSystems[i] for a specified WFMS, wfs. In step 1801, the init method of the scheduler model transformer and adapter is invoked and passed the required information. In pseudocode, this may be written as schedulers [i].modelTransformer.init (schedulers[i].jobs, schedulers[i].res, commonalities, simultaneities, overrides). In step 1802, a zero (e.g., successful) or one (e.g., unsuccessful) is returned to the requestor if starting of the scheduler, sch, was successful or was not successful, respectively. Method 1890 ends after step 1802.

Figure 19:
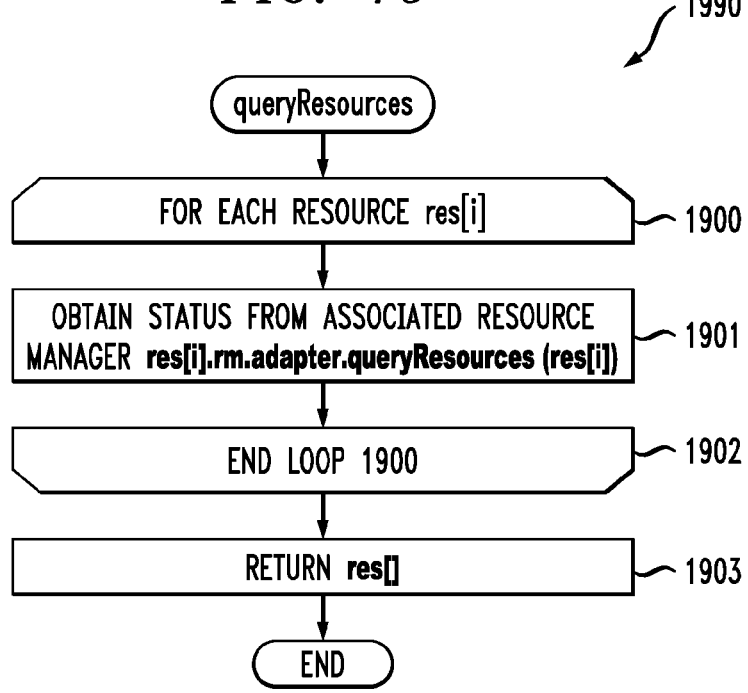
FIG. 19 is a flowchart of a method for querying resource information in accordance with an exemplary embodiment of the present invention.

With reference to FIG. 19, a method 1990 for querying resource information is illustrated in accordance with an exemplary embodiment of the present invention. The method 1990 may be illustratively named in pseudocode as PEMC.queryResources (res[]):rcs[]. The input parameter specifies one or more resources. Method 1990 is used by a scheduling system (e.g., schedulers 709) to request that the ProcessExecutionManagerController 705 obtain information on specified resources. Step 1900 begins a loop performed for each resource (e.g., res[i]) and that ends in step 1902. For each of the specified resources, the ProcessExecutionManagerController 705 invokes the queryResource method of the associated resource manager adapter in step 1901. In pseudocode, this may be written as res[i].rm.adapter.queryResources (res [i]). The results are returned to the requestor in step 1903 and method 1990 ends after step 1903.

Figure 20:
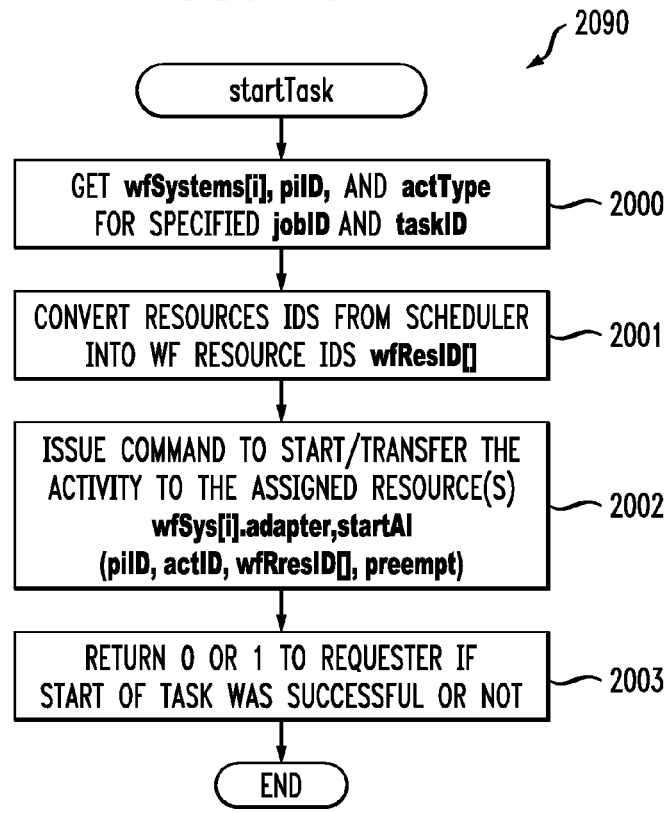
FIG. 20 is a flowchart of a method for starting a task, in accordance with an exemplary embodiment of the present invention.

Turning to FIG. 20, a method 2090 for performing starting a task is illustrated in accordance with an exemplary embodiment of the present invention. The method 2090 may be illustratively named in pseudocode as PEMC startTask (jobID, taskID, res[ ], preempt). The input parameters specify the job ID, the task ID, one or more resources, and a parameter indicating whether or not current assignments should be preempted. Method 2090 is used by a scheduling system (e.g., schedulers 709) to request that the ProcessExecutionManagerController 705 assign the specified one or more resources to the specified process activity instance (optionally, preempting previous assignments).

The first step is to match the scheduling system with one of those supported and get the process instance ID and activity instance ID for the specified job ID and task ID. This occurs in step 2000. The next step is to convert the resource ID or resource IDs used by the scheduler to those used by the WFMS, wfResID[ ], which occurs in step 2001. In step 2002, the ProcessExecutionManagerController 705 invokes a startActivityInstance method (indicated as "startAI" in FIG. 20) of the associated workflow system adapter to start the activity. This may be written in pseudocode as wfSys[i].adapter.startActivityInstance (piID, actID, wfresID[ ], preempt). In step 2003, a zero (e.g., successful) or one (e.g., unsuccessful) is returned to the requestor if the one or more resources were or were not assigned, respectively, to the activity instance for the process. Method 2090 ends after step 2003.

Figure 21:
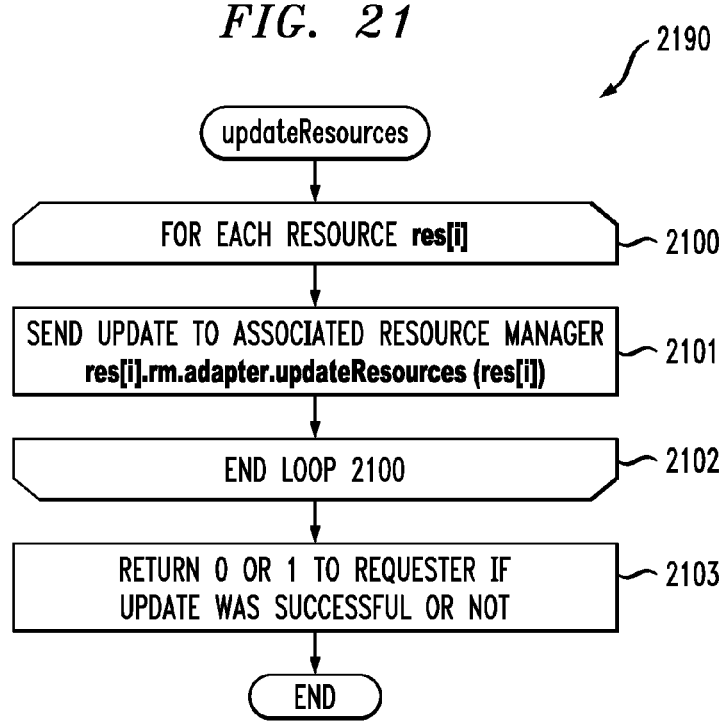
FIG. 21 is a flowchart of a method for updating resource information in accordance with an exemplary embodiment of the present invention.

With reference to FIG. 21, a method 2190 for updating resource information is illustrated in accordance with an illustrative embodiment of the present invention. The method 2190 may be illustratively named in pseudocode as PEMC.updateResources (res[ ]). The input parameter specifies one or more resources to be updated. Method 2090 is used by a scheduling system (e.g., scheduler 709) to send resource update information that the ProcessExecutionManagerController 705 obtains on the specified one or more resources.

Step 2100 begins a loop performed for each resource, res [i], and the loop ends in step 2102. For each of the specified resources, in step 2101, the ProcessExecutionManagerController 705 invokes the updateResource method of the associated resource manager adapter with the resource information. In pseudocode, this may be written as res[i].rm. adapter updateResources (res[i]). In step 2103, a zero (e.g., successful) or one (e.g., unsuccessful) is returned to the requestor if updating the resources was successful or was not successful, respectively. Method 2190 ends after step 2103.

Figure 22:
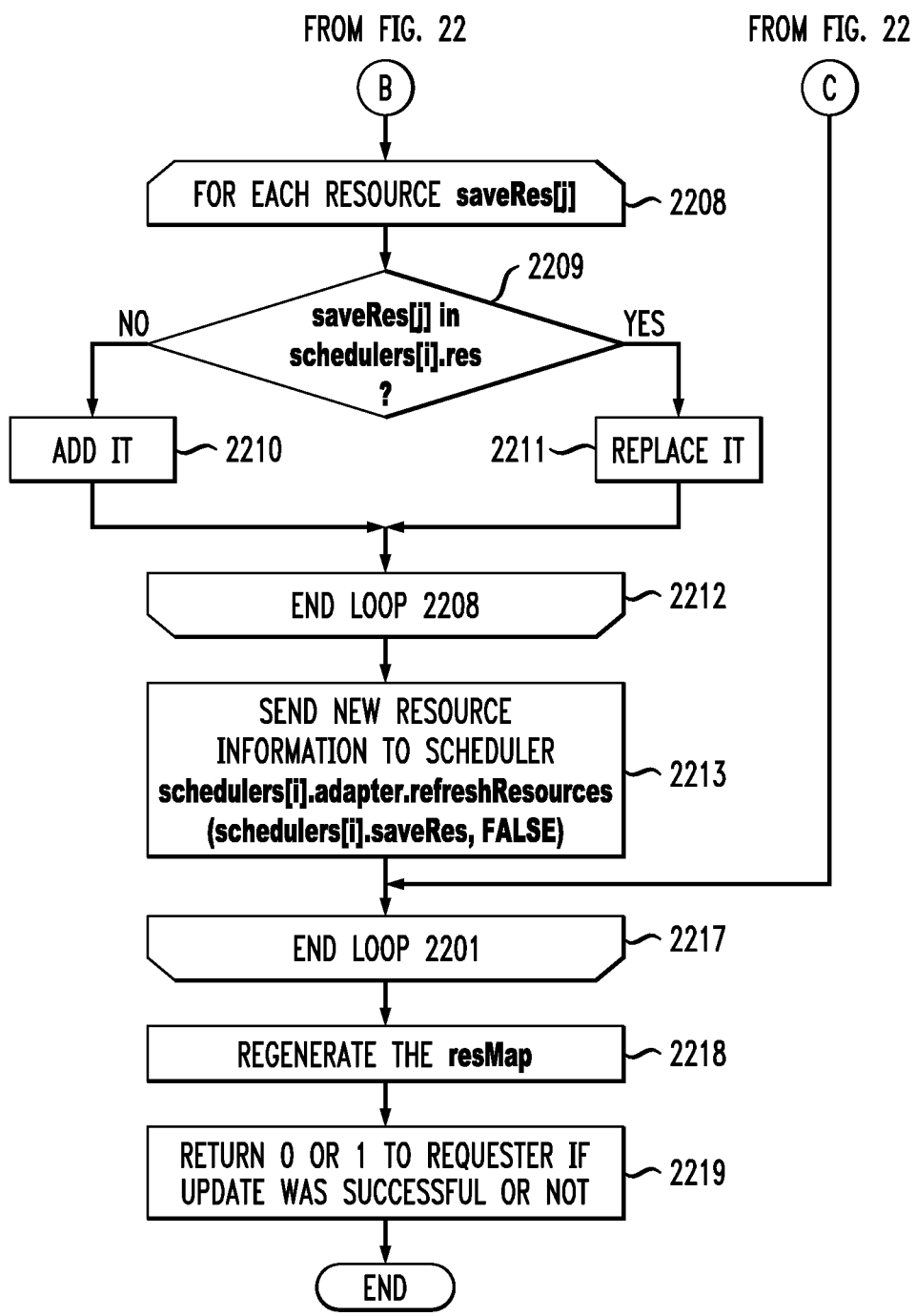
FIG. 22 is a flowchart of a method for requesting a refresh of the resource information, in accordance with an exemplary embodiment of the present invention.

With reference to FIG. 22, a method 2290 for performing a refresh resources request is illustrated in accordance with an exemplary embodiment of the present invention. The method 2290 may be illustratively named in pseudocode as PEMC refeshResources (rm, res[ ], all). The input parameters specify the resource manager to use, one or more resources to be refreshed, and a value indicating whether or not all resources are being refreshed. Method 2290 is used by a resource manager (e.g., resManager 707) to refresh resource information.

The first step (step 2200) is to match the resource manager (e.g., rm) with one of those resource managers that are supported (e.g., resManagers[i]). Step 2201 starts a loop performed for each scheduler (e.g., schedulers[i]), and this loop ends in step 2217. Thus, for each of the schedulers, steps 2201-2217 are performed. In step 2202, an empty list (saveRes) of resources is created. Step 2203 starts a loop performed for each resource, res[j], and the loop ends in step 2206. In step 2204, it is determined if the resources are managed by this scheduler, in pseudocode this may be written as "res[j].scheduler=schedulers[i]?". If not (step 2204→No), the loop 2203-2206 continue with the next resource, if any. If yes (step 2204=Yes), the resource is added to the list saveRes.

In step 2207, it is checked if all resources are being refreshed If yes (step 2207=Yes), then delete all resources for this resource manager in this schedulers list of resources in step 2214. In pseudocode, this may be written as delete all resources in schedulers[i].res, where schedulers[i].rm=rm. Then, add the new resource information to the scheduler in step 2215. In pseudocode, step 2215 can be written as "add saveRes to schedulers[i].res." Finally, in step 2216, the refreshResources method of the associated scheduling system model transformer and adapter is invoked with the list of resources for this scheduler and a value of TRUE. In pseudocode, this may be written as schedulers[i].modeTransformer refreshResources (schedulers[i].res, TRUE).

If no in step 2207, then step 2208 starts a loop performed for each resource managed by this scheduler, and the loop ends in step 2212. In step 2209, it is determined if this resource is already in the list of resources managed by this scheduler. In pseudocode, this can be written as saveRes[j] in schedulers[i].res. If it is (step 2209=Yes), then the resource information is updated in step 2211. Otherwise (step 2209=No), add the resource information to the list kept by the scheduler in step 2210. Finally, in step 2213, the refreshResources method of the associated scheduling system model transformer and adapter is invoked with the list of resources for this scheduler and a value of FALSE. In pseudocode, this may be written as schedulers[i].adapter.refreshResources (schedulers[i].saveRes, FALSE).

Once steps 2201-2217 have been completed for all schedulers supported, the resource map (e.g., resMap 711) for all the resources is regenerated. This occurs in step 2218. In step 2219, a zero (e.g., successful) or one (e.g., unsuccessful) is returned to the resource refresh did complete or did not complete, respectively. Method 2290 ends after step 2219.

Figure 23:
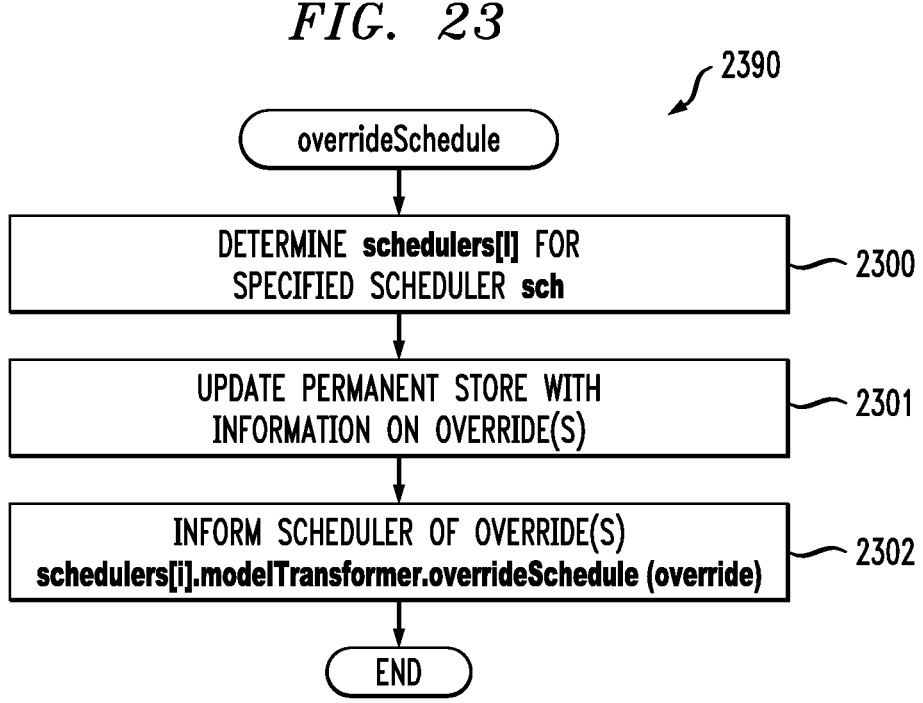
FIG. 23 is a flowchart of a method for handling an override to a schedule, in accordance with an exemplary embodiment of the present invention.

With reference to FIG. 23, a method 2390 for requesting to override a schedule is illustrated in accordance with an exemplary embodiment of the present invention. The method 2390 may be illustratively named in pseudocode as overrideSchedule (sch, override[ ]). The input parameters specify a scheduler and one or more overrides. Method 2390 is used by a resource manager (e.g., resManagers 707) to request that the ProcessExecutionManagerController 705 override resource assignment or resource assignments made by the scheduler.

The first step (step 2300) is to match the scheduling system, sch, with one of a number of supported schedulers, schedulers [i]. The next step (step 2301) is to record the override information in a store such as store 514 in FIG. 5. In step 2302, the ProcessExecutionManagerController 705 invokes the overrideSchedule method of the associated scheduling system model transformer and adapter with the override information. In pseudocode, this may be written as schedulers[i].modelTransformer.overrideSchedule (override). Method 2390 ends after step 2302.

Figure 24:
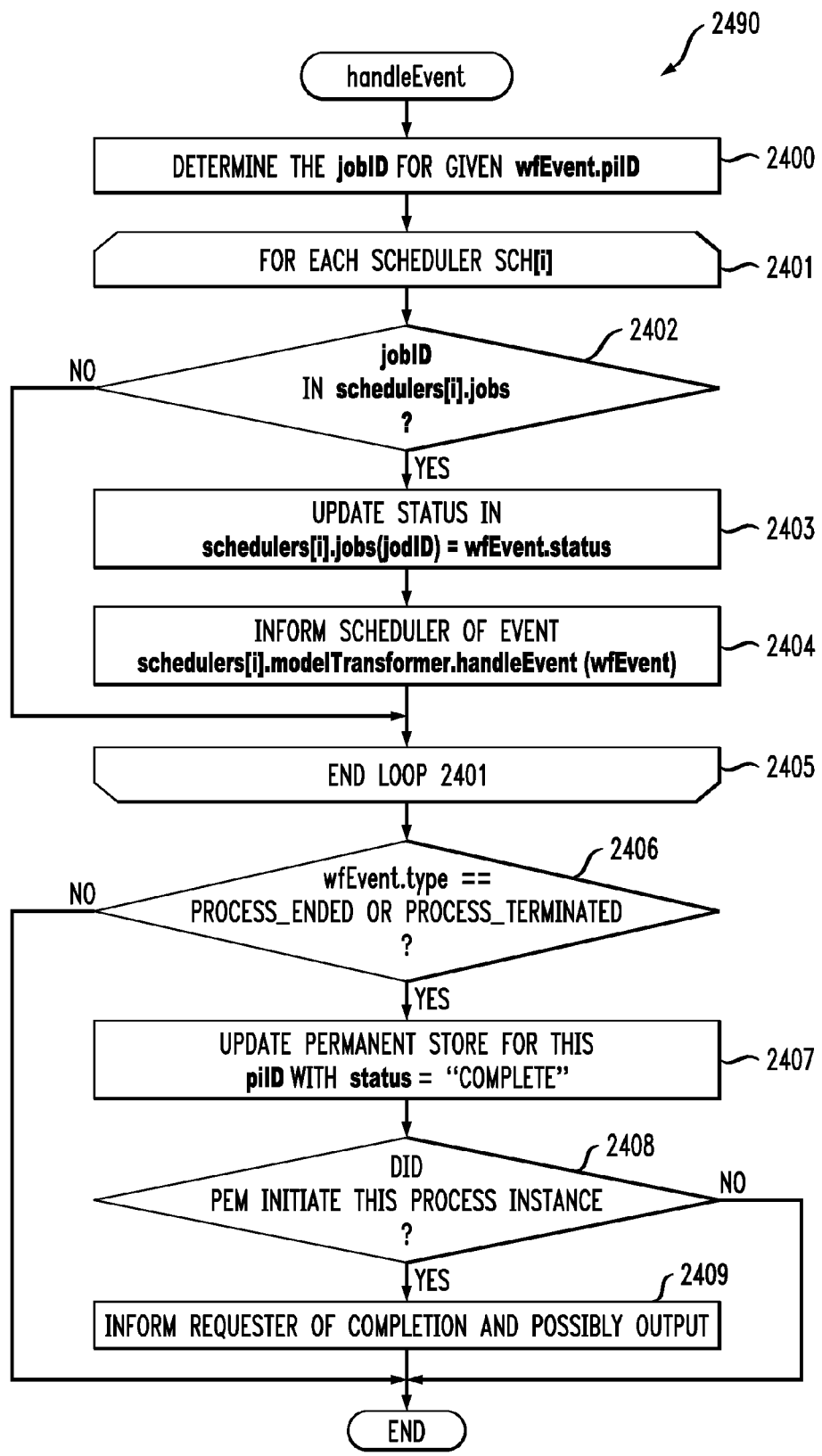
FIG. 24 is a flowchart of a method for requesting handling of a workflow event in accordance with an exemplary embodiment of the present invention.

Turning now to FIG. 24, a method 2490 for requesting handling of an event is illustrated in accordance with an illustrative embodiment of the present invention. The method 2490 may be illustratively named in pseudocode as wfSystems[i].adapter.mon.handleEvent (wfEvent). The input parameter specifies an event to be handled. Method 2490 is used by a WFMS (illustratively, a workflow adapter) to inform the appropriate monitor in ProcessExecutionManagerController 705 of progress in the execution of process instances.

The first step (2400) is to determine the job ID, jobID, corresponding to the specified process instance ID, wfevent. piID. Step 2401 begins a loop performed for each scheduler, sch[i], and the loop ends in step 2405. Steps 2401-2405 are therefore performed for each scheduler. In step 2402, it is determined if this job, jobID, is being scheduled by this scheduler. In pseudocode, this may be written as "jobID in scheduler's[i].jobs?".

If yes (step 2402=Yes), the status is updated in step 2403 (e.g., schedulers[i].jobs(jobID)=wfEvent.status). In step 2404, the handleEvent method of the appropriate scheduler model transformer and adapter is invoked with the details of the event. This may be written in pseudocode as the following: scheduler[i].modelTransformer.handleEvent (wfEvent). If step 2402 is No, another scheduler is selected in step 2405 and the method 2490 continues in step 2402.

Once all scheduler's have been examined, in step 2405 it is determined if the event indicated the end of a process instance. If not (step 2406=No), the method 2490 ends. If so (step 2406=Yes), a store such as store 511 in FIG. 5 would be updated with the status (e.g., "complete") of this process instance (defined by, e.g., piID) in step 2407. In step 2408, it is determined if the ProcessExecutionManagerController 705 (e.g., PEMC) initiated this process instance. If yes (step 2408=Yes), in step 2409, the requester is informed of the end of the process instance and any output, if necessary, is communicated to the requestor. If not (step 2408=No), method 2490 ends.

It is to be understood that the embodiments and variations shown and described herein are merely illustrative of the principles of this invention and that various modifications may be implemented by those skilled in the art without departing from the scope and spirit of the invention.

What is claimed is:

1. A method for managing execution of processes on a data processing system, the data processing system comprising one or more process instances that are each an execution of a corresponding process, each process instance comprising multiple activity instances, the method comprising the steps of:

> determining one or more business impacts for the one or more process instances, the multiple activity instances, or both the one or more process instances and the multiple activity instances;
>
> weighting the one or more business impacts to create one or more weighted business impacts, wherein said weighting comprises determining a level of relative preference to each of the one or more business impacts based on (i) information derived from an organization managing the one or more process instances and the multiple activity instances that identifies (a) one or more types of requests to be preferentially weighted over other types of requests and (b) one or more customers to be preferentially weighted over other customers, and (ii) information derived from a database comprising one or more past executions of the one or more process instances and/or activity instances and corresponding business impacts associated therewith;
>
> managing order of execution of the multiple activity instances by allocating resources to the multiple activity instances in an environment with insufficient resources to simultaneously perform all of the multiple activity instances in order to achieve an objective defined in terms of the one or more weighted business impacts, and wherein said management step is performed by one or more hardware devices;
>
> receiving one or more requests for execution of one or more processes;
>
> for a given one of the one or more requests, performing one or more of assigning, updating, and aggregating of one or more first business impacts associated with the given request to create one or more second business impacts associated with the given request, the given request for execution of a given process;
>
> modifying a given request of the one or more requests to create a modified request, the modified request for execution of the given process or another process; and
>
> wherein the step of managing further comprises the step of managing unmodified requests and any modified requests.

2. The method of claim 1, wherein the step of performing further comprises the step of repeating the performing step, in a manner so as to improve cost and efficiency of execution of the one or more process instances, wherein the cost and efficiency is determined by one or more criteria set by an organization.

3. The method of claim 1, wherein:
the one or more process instances comprises a plurality of process instances; and
the data processing system comprises one or more Workflow Management Systems (WFMSs), each WFMS comprising at least one of the plurality of process instances.

4. The method of claim 1, wherein a given activity instance corresponds to an activity, the activity instance to be executed by an organization that controls a resource that is to perform the activity but wherein the organization does not control the data processing system.

5. The method of claim 1, wherein a given process in the data processing system ranges from simple task lists to complex task graphs.

6. The method of claim 1, wherein a given process in the data processing system can be fully automated or partially automated.

7. The method of claim 1, wherein:
the multiple activity instances and the relative order of execution of some of the multiple activity instances within a process instance are described by one or more workflow process models; and
the step of managing further comprises the step of managing order of execution of activity instances by allocating resources to activity instances in order to achieve the objective while satisfying one or more constraints of the one or more workflow process models as well as overrides from one or more resource managers.

8. The method of claim 1, wherein a given activity instance to be performed may require zero, one, or more resources.

9. The method of claim 1, wherein a given one of the one or more business impacts comprises one or more of a simple priority, a utility function, a step function, and a cost function over time.

10. The method of claim 1, wherein the objective is defined by an objective function or a pointer to the objective function.

11. The method of claim 1, wherein a resource comprises but is not limited to one of the following: a person, a software agent, hardware, a license, or a combination thereof.

12. A data processing system for managing execution of processes, the data processing system comprising:

> a memory that stores computer-readable code, one or more process instances, and multiple activity instances, wherein the one or more process instances are each an execution of a corresponding process, each process instance comprising multiple activity instances; and
>
> a processor operatively coupled to said memory, said processor configured to implement said computer-readable code, said computer-readable code configured to perform the steps of:
>
>> determining one or more business impacts for the one or more process instances, the multiple activity instances, or both the one or more process instances and the multiple activity instances;
>>
>> weighting the one or more business impacts to create one or more weighted business impacts, wherein said weighting comprises determining a level of relative preference to each of the one or more business impacts based on (i) information derived from an organization managing the one or more process instances and the multiple activity instances that identifies (a) one or more types of requests to be preferentially weighted over other types of requests and (b) one or more customers to be preferentially weighted over other customers, and (ii) information derived from a database comprising one or more past executions of the one or more process instances and/or activity instances and corresponding business impacts associated therewith;
>>
>> managing order of execution of the activity instances by allocating resources to activity instances in an environment with insufficient resources to simultaneously perform all activity instances in order to achieve an objective defined in terms of the one or more weighted business impacts;
>>
>> receiving one or more requests for execution of one or more processes;
>>
>> for a given one of the one or more requests, performing one or more of assigning, updating, and aggregating of one or more first business impacts associated with the given request to create one or more second business impacts associated with the given request, the given request for execution of a given process;

modifying a given request of the one or more requests to create a modified request, the modified request for execution of the given process or another process; and wherein the step of managing further comprises the step of managing unmodified requests and any modified requests.

13. A method for managing requests for execution of one or more processes on a data processing system, the data processing system comprising one or more process instances that are each an execution of a corresponding process, each process instance comprising multiple activity instances, the method comprising the steps of:

determining one or more business impacts for the one or more process instances, the multiple activity instances, or both the one or more process instances and the multiple activity instances;

receiving one or more requests for the execution of the one or more processes;

for a given one of the one or more requests, weighting one or more first business impacts to create one or more weighted first business impacts and performing one or more of assigning, updating, and aggregating the one or more weighted first business impacts associated with the given request to create one or more second business impacts associated with the given request, the given request for execution of a given process, wherein said weighting comprises determining a level of relative preference to each of the one or more business impacts based on (i) information derived from an organization managing the one or more process instances and the multiple activity instances that identifies (a) one or more types of requests to be preferentially weighted over other types of requests and (b) one or more customers to be preferentially weighted over other customers, and (ii) information derived from a database comprising one or more past executions of the one or more process instances and/or activity instances and corresponding business impacts associated therewith;

modifying a given request of the one or more requests based on input from an entity associated with the given request to create a modified request, the modified request for execution of the given process or another process; and managing unmodified requests and any modified requests in order to manage an order of execution of the activity instances across processes corresponding to the unmodified and modified requests in an environment with insufficient resources to simultaneously perform all activity instances in order to achieve an objective defined in terms of the one or more weighted business impacts, and wherein said management step is performed by one or more hardware devices.

14. The method of claim 13, wherein:

the data processing system further comprises one or more process instances that are each an execution of a corresponding process, each process instance comprising multiple activity instances; and the step of managing further comprises the step of managing order of execution of the activity instances by allocating resources to activity instances in order to achieve an objective defined in terms of the one or more second business impacts.

15. The method of claim 13, wherein the method further comprises the step of determining, using one or more predetermined criteria, that a goal of the given process is the same as a goal of a first process corresponding to a first request of the one or more requests; and the step of modifying further comprises the step of altering the given request to the modified request, the modified request for execution of the first process.

16. The method of claim 15, wherein the step of performing further comprises the step of performing one or more of assigning, updating, aggregating, and weighting of one or more first business impacts associated with the given request to create the one or more second business impacts; and the step of modifying further comprises the step of associating the one or more second business impacts with the modified request.

17. The method of claim 13, wherein:

the step of performing further comprises the step of performing one or more of assigning, updating, and aggregating the one or more weighted first business impacts associated with the given request to create one or more second business impacts associated with the given request, wherein the assigning operation assigns one or more default business impacts associated with the given request to create the one or more second business impacts.

18. The method of claim 13, wherein:

the method further comprises the steps of:

receiving the given request and at least one additional request of the one or more requests; and determining, using one or more procedures, that the given request and the at least one additional request of the one or more requests are related; and the step of modifying further comprises the step of combining the related requests into the modified request.

19. The method of claim 18, wherein a given one of the one or more procedures is defined by an organization.

20. The method of claim 18, wherein each of the given request and the at least another request each comprises a request for execution of the given process.

21. The method of claim 18, wherein:

the step of performing further comprises the step of performing one or more of assigning, updating, and aggregating the one or more weighted first business impacts associated with the given request and the at least one additional request to create one or more second business impacts associated with the given request; and the step of combining the related requests further comprises the step of associating the one or more second business impacts with the modified request.

22. A data processing system for managing requests for execution of one or more processes, the system comprising:

a memory that stores computer-readable code, one or more process instances, and multiple activity instances, wherein the one or more process instances are each an execution of a corresponding process, each process instance comprising multiple activity instances; and a processor operatively coupled to said memory, said processor configured to implement said computer-readable code, said computer-readable code configured to perform the steps of:

determining one or more business impacts for the one or more process instances, the multiple activity instances, or both the one or more process instances and the multiple activity instances;

receiving one or more requests for the execution of the one or more processes;

for a given one of the one or more requests, weighting one or more first business impacts to create one or more weighted first business impacts and performing one or more of assigning, updating, and aggregating the one or more weighted first business impacts associated with the given request to create one or more second business impacts associated with the given request, the given request for execution of a given process, wherein said weighting comprises determining a level of relative preference to each of the one or more business impacts based on (i) information derived from an organization managing the one or more process instances and the multiple activity instances that identifies (a) one or more types of requests to be preferentially weighted over other types of requests and (b) one or more customers to be preferentially weighted over other customers, and (ii) information derived from a database comprising one or more past executions of the one or more process instances and/or activity instances and corresponding business impacts associated therewith;

modifying a given request of the one or more requests based on input from an entity associated with the given request to create a modified request, the modified request for execution of the given process or another process; and managing unmodified requests and any modified requests in order to manage an order of execution of the activity instances across processes corresponding to the unmodified and modified requests in an environment with insufficient resources to simultaneously perform all activity instances in order to achieve an objective defined in terms of the one or more weighted business impacts.

\* \* \* \* \*